US006385655B1

(12) United States Patent
Smith et al.

(10) Patent No.: US 6,385,655 B1
(45) Date of Patent: *May 7, 2002

(54) METHOD AND APPARATUS FOR DELIVERING DOCUMENTS OVER AN ELECTRONIC NETWORK

(75) Inventors: Jeffrey C. Smith, Menlo Park; Jean-Christophe Bandini, Cupertino; Randy Shoup, San Francisco, all of CA (US)

(73) Assignee: Tumbleweed Communications Corp., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/957,986

(22) Filed: Oct. 2, 1997

Related U.S. Application Data

(63) Continuation-in-part of application No. 08/832,784, filed on Apr. 4, 1997, now Pat. No. 6,192,407, which is a continuation-in-part of application No. 08/738,966, filed on Oct. 24, 1996, now Pat. No. 5,790,790.

(51) Int. Cl.[7] ............................................. G06F 15/177

(52) U.S. Cl. ..................... 709/232; 709/232; 709/246; 710/36; 710/240; 713/201

(58) Field of Search ................................ 709/219, 225, 709/229, 232, 246; 340/825.5, 825.34; 710/36, 240; 713/201

(56) References Cited

U.S. PATENT DOCUMENTS

| 4,532,588 A | | 7/1985 | Foster ........................ 364/200 |
| 4,713,780 A | | 12/1987 | Schultz et al. .............. 364/514 |
| 4,754,428 A | | 6/1988 | Schultz et al. .............. 364/900 |
| 4,837,798 A | * | 6/1989 | Cohen et al. ................. 379/88 |
| 5,008,814 A | | 4/1991 | Mathur ....................... 364/200 |

(List continued on next page.)

Primary Examiner—Mark H. Rinehart
Assistant Examiner—Stephan Willett
(74) Attorney, Agent, or Firm—Skadden, Arps, Slate, Meagher & Flom LLP

(57) ABSTRACT

A method and apparatus are provided for securely delivering documents over an electronic network while preserving document formatting. The invention also provides security that restricts access to the system to an authorized user. A document is sent from a sending computer to a dedicated server, using a send client application. The document is specified for delivery within the send client application, or by clicking and dragging the document onto an appropriate window or icon on the sending computer desktop, or is specified from within a document authoring application. A dedicated server stores the document and forwards an electronic notification to a receiving device. The stored document is downloaded from the dedicated server, using a receive client application, in response to the notification. The receive client application permits the recipient to receive, view, print, and/or manipulate the document. The dedicated server is preferably managed by a configuration user interface having an HTML interface for sending, tracking, accessing account information, managing billings, and managing mail distribution lists. The send client application allows a user to specify document delivery parameters. The parameters may be stored for later modification and/or use.

103 Claims, 26 Drawing Sheets

U.S. PATENT DOCUMENTS

| | | | |
|---|---|---|---|
| 5,210,824 A | 5/1993 | Putz et al. | 395/145 |
| 5,293,250 A | 3/1994 | Okumura et al. | 358/402 |
| 5,404,231 A | 4/1995 | Bloomfeild | 358/400 |
| 5,406,557 A | 4/1995 | Baudoin | 370/61 |
| 5,416,842 A | 5/1995 | Aziz | 380/30 |
| 5,424,724 A | 6/1995 | Williams et al. | 340/825.05 |
| 5,495,610 A | 2/1996 | Shing et al. | 395/600 |
| 5,513,126 A | 4/1996 | Harkins et al. | 364/514 A |
| 5,550,984 A | 8/1996 | Gelb | 395/200.17 |
| 5,608,874 A * | 3/1997 | Ogawa et al. | 395/200.15 |
| 5,675,507 A * | 10/1997 | Bobo, II | 364/514 R |
| 5,677,955 A * | 10/1997 | Doggett et al. | 380/24 |
| 5,706,442 A | 1/1998 | Anderson et al. | 395/227 |
| 5,708,780 A | 1/1998 | Levergood et al. | 395/200.12 |
| 5,710,883 A | 1/1998 | Hong et al. | 395/200.17 |
| 5,727,156 A | 3/1998 | Herr-Hoyman et al. | 395/200.49 |
| 5,751,956 A | 5/1998 | Kirsch | 395/200.33 |
| 5,758,343 A | 5/1998 | Vigil et al. | 707/10 |
| 5,764,906 A | 6/1998 | Edelstein et al. | 395/200.49 |
| 5,778,372 A | 7/1998 | Cordell et al. | 707/100 |
| 5,781,901 A | 7/1998 | Kuzma | 707/10 |
| 5,790,790 A * | 8/1998 | Smith et al. | 395/200.36 |
| 5,790,793 A | 8/1998 | Higley | 395/200.48 |
| 5,793,972 A | 8/1998 | Shane | 395/200.49 |
| 5,805,719 A | 9/1998 | Pare, Jr. et al. | 382/115 |
| 5,812,776 A | 9/1998 | Gifford | 395/200.47 |
| 5,845,084 A | 12/1998 | Cordell et al. | 395/200.64 |
| 5,850,442 A * | 12/1998 | Muftic | 380/21 |
| 5,855,020 A | 12/1998 | Kirsch | 707/10 |
| 5,860,068 A * | 1/1999 | Cokk | 705/26 |
| 5,903,723 A | 5/1999 | Becker et al. | 395/200.3 |
| 5,923,846 A * | 7/1999 | Gage et al. | |
| 5,948,062 A * | 9/1999 | Tzelnic et al. | 709/219 |
| 6,122,661 A * | 9/2000 | Stedman et al. | |

* cited by examiner

METHOD AND APPARATUS FOR DELIVERING DOCUMENTS OVER AN ELECTRONIC NETWORK

This is a continuation-in-part of U.S. patent application Ser. No. 08/832,784 filed Apr. 4, 1997, now U.S. Pat. No. 6,192,407, which is a continuation-in-part of U.S. patent application Ser. No. 08/738,966 filed Oct. 24, 1996 (now U.S. Pat. No. 5,790,790).

BACKGROUND OF THE INVENTION

1. Technical Field

The invention relates to communication over an electronic network. More particularly, the invention relates to a method and apparatus for delivering formatted documents over an electronic network, such as the Internet, in a secure fashion.

2. Description of the Prior Art

Electronic networks, such as the Internet and intranets are increasingly being used to store and distribute a variety of data. For example, a World Wide Web (Web) page may include text, graphical displays, video displays, animation, and sounds. The Web enables a recipient to receive a document from a sender, regardless of platform, operating system, or E-mail system. Such communication is possible even when the document is not received at a computer but, rather, is received at a fax machine or networked printer connected to the Internet.

In many instances, the sender of a document resides on a local area network, referred to herein as an intranet. The sender's computer may be connected to the Internet directly, or through the intranet's server. Users who do not have a direct Internet connection can subscribe to the services of an access provider, called an Internet Service Provider (ISP) in the case of the Internet.

The ISP maintains a network that connects its clients to the Internet, providing a server computer that acts as a host to its clients. The client accesses the Internet by using a computer with a modem to dial up the ISP, through the public telephone system. The ISP usually provides a point-to-point (serial) link through which the client communicates directly to the Internet, using the Internet standard TCP/IP protocols.

Existing transmission schemes are frequently not suitable for sending certain documents over, for example, the Internet. Critical documents must be sent with complete security. However, the disparate E-mail systems have varying levels of security support. It is therefore difficult or impossible to determine whether an electronic communication is secure.

Various cryptographic schemes have been used to provide security for electronic communications. However, the recipient of an encrypted message must have not only the decryption scheme, but sufficient hardware and software to decrypt the communication. Thus, it is frequently not practical or possible to send such an encrypted message.

Thus, users are often reluctant to send documents electronically. These users must rely upon the slower and more expensive methods of courier service, and conventional mail service.

It is also desirable to be able to track a critical or sensitive document to insure that it has been properly received. However, it is extremely difficult, if not impossible, to track a document from point to point along the electronic network. For example, an E-mail message sent via the Internet is broken up into many discrete data packets. The packets are sent separately through the Internet to the intended recipient. Each packet may take a different route before being rejoined to form the original a document and delivered to the recipient. Therefore, tracking such document has required tracking each individual packet through each link of the Internet.

Additionally, while a computer may provide some level of security for a received document, for example, with passwords or cryptography, an electronic communication is not necessarily directed to a computer. Thus, a critical document sent electronically to a printer or a fax machine is potentially exposed to public view.

Even if such document is transmitted securely, it may not be legible when received. One problem common to E-mail is loss of document formatting. A document sent via E-mail is typically sent either as text in the body of the E-mail message, or as an attachment thereto. A text document usually does not retain the formatting of the original document. An attached document can retain formatting in some circumstances, such as if both sender and recipient have compatible software applications. However, some formatting may be lost even when the recipient opens a received document using the same application in which the document was created.

Changes in document formatting can create significant problems. Electronic forms may not be compatible if their formats are different. A misformatted document may not be comprehensible to the recipient. While many formatting changes are correctable, the costs to the recipient in terms of time and expense may be substantial.

It would therefore be an advantage to provide a method and apparatus for securely delivering documents over an electronic network, such as the Internet. It would be a further advantage if such method and apparatus tracks the sending and receipt of a document. It would be yet another advantage if such method and apparatus preserves the formatting of a delivered document.

SUMMARY OF THE INVENTION

In accordance with the present invention, a method and apparatus securely deliver documents over an electronic network. Specifically, a user can track the sending and receipt of a document, while preserving the document's original formatting.

For the purposes of the discussion herein, the term "document" includes any contiguous collection of data, including a stream of data, video data, audio data, animation, a platform-independent formatted document such as an HTML, PDF, or Envoy document, a platform-specific formatted document such as a Microsoft Word or Excel document, an unformatted document such as a text document, a custom-generated report or Web page, or a grouping of one or more database records, such as SQL records. The term document can also include a grouping of one or more such documents. While the preferred embodiment of the invention is adapted for use in document transmission over the Internet, the invention is equally applicable to other wide area or local area networks.

In accordance with a presently preferred embodiment of the invention, a send client application is provided that allows a user to send a document over an electronic network from the desktop of a sending computer. Such document may also be sent from within a document authoring application.

A dedicated server is provided to store the document received from the sending computer. The dedicated server then forwards an electronic message to a receiving device to notify the recipient of the document's transmission.

The intended recipient downloads the stored document from the dedicated server in response to this message. In the preferred embodiment of the invention, the receiving device is a personal computer. However, in alternate embodiments, the receiving device includes a network server device, fax machine, printer, Internet-compatible telephone, Internet access appliance, or personal digital assistant.

A receive client application provided on the receiving device is used to download the document from the dedicated server. The receive client application is preferably a Web browser, but can be any other software application capable of retrieving the stored document while preserving document formatting. The receive client application permits the recipient to receive, view, print, and manipulate the document.

The send client application is accessed via an application window. The application window is displayed on the sending computer's desktop. The application window includes a persistent tool bar for accessing main functions and a menu listing operational commands for the send client application.

A package manager and a package window are also accessed from the application window. The package manager lists all document activities initiated during an application session. The package window allows the user to specify parameters of the document delivery, including the recipient(s), the document(s), and send options. Document delivery parameters may be stored in a storage module for later modification and/or use.

A document is specified for delivery in several ways. The user can click and drag the document from the sending computer desktop onto one of the application window or the package window. The document may also be dragged onto either the icon representing the send client application or the icon for accessing the stored document delivery parameters. The user can also browse local and network directories and select desired documents. A document can also be sent from within a document authoring application.

A configuration user interface (CUI) is provided for directly invoking and customizing the dedicated server. In the preferred embodiment of the invention, the CUI is an HTML interface. The dedicated server is therefore directly invoked and customized via a Web browser. This HTML interface includes modules for sending and tracking the document, accessing account information, managing billings, and managing mail distribution lists.

The CUI is accessed via a CUI application window displayed on a managing computer desktop. The managing computer can be the sending computer, the receiving computer, the dedicated server, or some other entity in the electronic network. The CUI application window displays a main tool bar for accessing main functions, and a secondary tool bar for accessing secondary functions. The CUI application window also includes a workspace for displaying an interactive interface to an accessed function, and a menu listing operational commands.

The invention also provides a security framework that restricts system access to an authorized user. The types of security supported include authentication layers, secure socket layers, password protection, private key encryption, public key encryption, and certificate authentication. The security framework can be implemented as one or more modules, and can be incorporated into at least one of the send client application, the receive client application, and the CUI.

DETAILED DESCRIPTION OF THE INVENTION

In accordance with the present invention, a method and apparatus securely deliver a document over an electronic network. Specifically, a user can track the sending and receipt of such a document. Throughout the delivery, the formatting of the document is preserved.

For the purposes of the discussion herein, the term "document" includes any contiguous collection of data, including a stream of data, video data, audio data, animation, a platform-independent formatted document such as an HTML, PDF, or Envoy document, a platform-specific formatted document such as a Microsoft Word or Excel document, an unformatted document such as a text document, a custom-generated report or Web page, or a grouping of one or more database records, such as SQL records. The term document can also include a grouping of one or more such documents. While the preferred embodiment of the invention is adapted for use in document transmission over the Internet, the invention is equally applicable to other wide area or local area networks.

The display screens and configuration of the graphical user interface described below are provided in accordance with the presently preferred embodiment of the invention. However, one skilled in the art will appreciate that such display screens and graphical user interfaces are readily modified to meet the requirements of alternative embodiments of the invention. The following discussion is therefore provided for purposes of example and not as a limitation on the scope of the invention.

Figure 1:
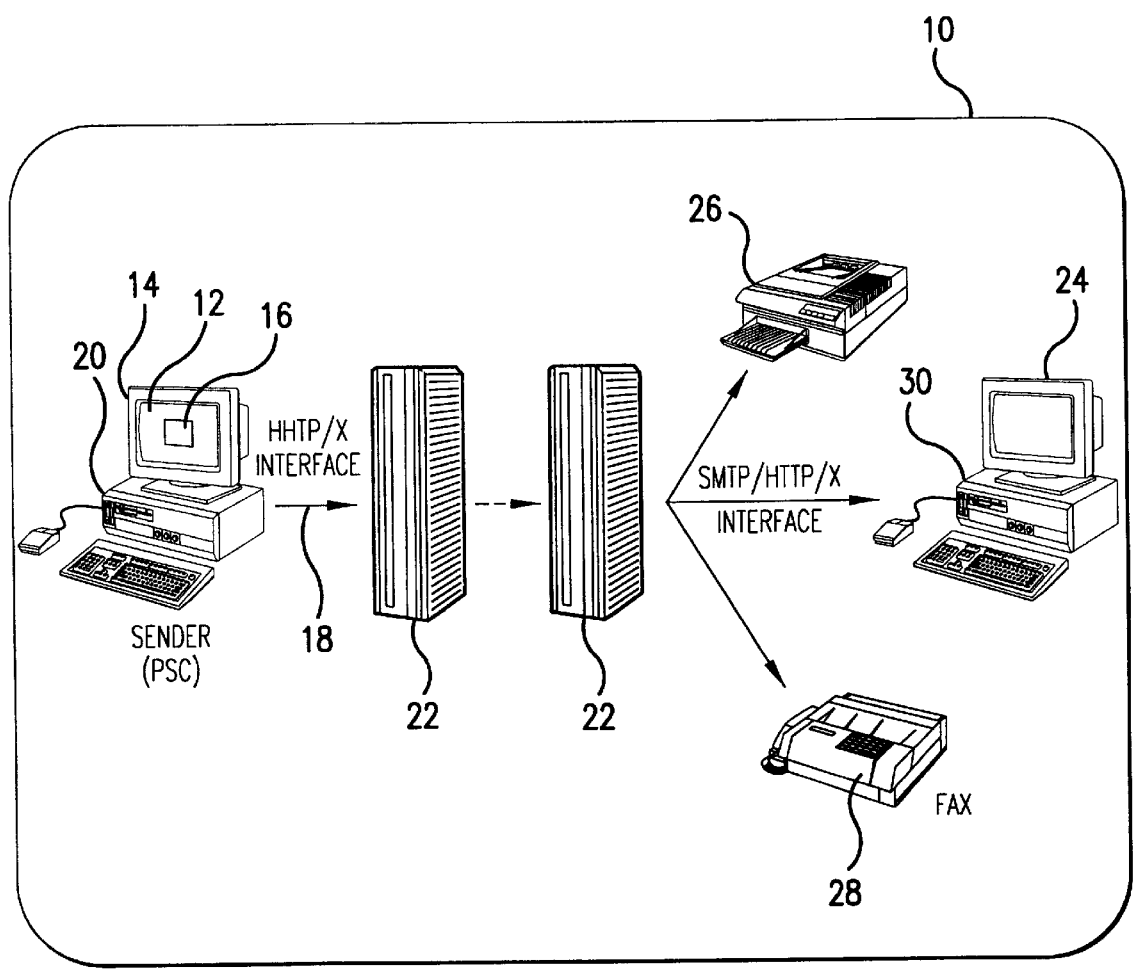
FIG. 1 is a diagram of a document delivery system according to the invention.

FIG. 1 is a diagram of a document delivery system 10 according to the invention. The system allows the user to send a document 16 or set of documents and a recipient address or set of recipient addresses from the desktop 12 of a sending computer 14 over an electronic network 18 using a send client application 20. Such document may also be sent from within a document authoring application, such as a word processor, spreadsheet, or graphics application. The send client application is preferably stored on the sending computer, but may be stored in a remote location accessible to the sending computer.

The sending computer connects to a dedicated server 22. The dedicated server functions in accordance with such standards as, for example Internet standards to manage the transfer of documents between senders and recipients. The dedicated server may be a server provided by an Internet service provider (ISP), or may be a separate dedicated server.

In the preferred embodiment of the invention, documents are uploaded to, and downloaded from the dedicated server using the hypertext transport protocol (HTTP). HTTP is the communications protocol used to connect to servers on the World Wide Web ("Web"). A significant advantage of HTTP is that it is application and platform-independent. Thus, the sender and recipient do not need to use the same Web browser, or even the same operating system.

The dedicated server 22 stores the document received from the sending computer 14. The dedicated server then forwards an electronic message to a receiving device at the address received from the send client application to notify the intended recipient of the document's transmission. This notification message is sent as a text (e.g. ASCII) message using the simple mail transport protocol (SMTP) of the Internet.

In the preferred embodiment of the invention, the receiving device is a personal computer 24. However, in alternate embodiments, the receiving device may include a printer 26, fax machine 28, network server device, Internet-compatible telephone, Internet access appliance, or personal digital assistant (not shown).

The notification message contains the uniform resource locator (URL) of the document, which allows the server to locate the document. In response to this message, the intended recipient downloads the stored document from the dedicated server 22 with a receive client application 30. The receive client application is preferably stored at the receiving device, but may be stored in a remote location that is accessible to the receiving device. The receive client application permits the recipient to receive, view, print, and/or manipulate the document.

In the preferred embodiment of the invention, the receive client application is a Web browser. Thus, the intended recipient can copy the URL directly from the notification message, and paste URL into a Web browser on the receiving computer. The Web browser then retrieves the document from the dedicated server. In alternative embodiments of the invention, the receive client application is any other software application capable of retrieving the stored document from the dedicated server while maintaining document formatting.

The send client application is readily installed on a computer from a CD-ROM, or by downloading from the Web. For example, a user who already has an account with a dedicated server provider can configure the send client application with the appropriate account information. A user who does not have such an account is directed to a URL that has the information for setting up an account.

Figure 2:
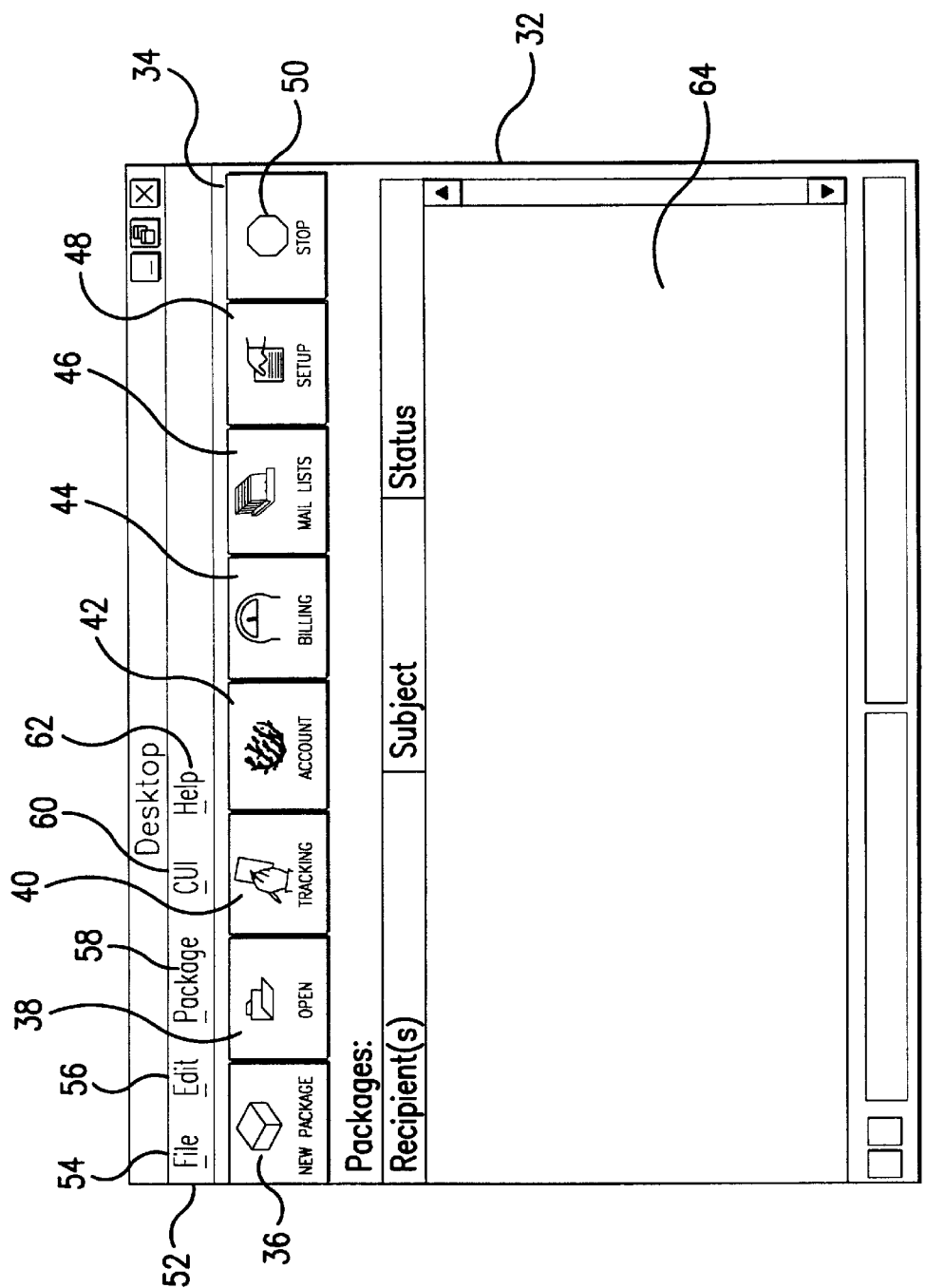
FIG. 2 is a view of an application window according to the invention.

The send client application is accessed via an application window displayed on the sending computer's desktop. The application window is displayed once the account information is properly configured. FIG. 2 is a view of an application window 32, according to the preferred embodiment of the invention.

The main function of the application window is to view the status of, and to manage send client application activity. The application window also serves as a launching pad to reach the various functions of the send client application and the configuration user interface CUI (discussed below).

In the preferred embodiment of the invention, the application window displays a main tool bar 34 for accessing main functions of the send client application. One such function is the selectable button for new package 36. Clicking on new package opens a new package window (discussed below), which allows a user to initiate a delivery of a document. Clicking on the open button 38 opens either a saved delivery parameter or a saved package window (discussed below).

In the preferred embodiment, the main tool bar 34 includes buttons that are Internet shortcuts to CUI functions. Clicking on such button launches the user's Web browser and displays the appropriate page in the CUI. In the preferred embodiment of the invention, no additional login is required in this process. Examples of such buttons include tracking 40, account 42, billing 44, and mail lists 46 buttons.

Buttons may also be provided for send client application settings. For example, a preferences dialog accessed via a setup button 48 permits the user to specify dedicated server and proxy server account information. The user can also specify whether or not to use a low-level secure communications protocol, such as Secure Socket Layer (SSL) to secure the connection between the desktop and the dedicated server for all transmissions.

The send client application can access the local address books of supported applications. In the preferred embodiment of the invention, the user selects the setup button 48 and is presented with a pull-down menu which lists the address books supported by the invention. The user then selects the desired address book file.

A stop button 50 is used to stop transmission of all information to the dedicated server. In the preferred embodiment of the invention, once clicked, the stop button remains depressed. To resume transmission, the user clicks on the button again, and it returns to a raised position.

The menu 52 lists operational commands for the send client application. In the preferred embodiment of the invention, the file menu 54 contains commands that have the same functionalities as buttons on the main tool bar 34. Other commands provide information regarding the send client application, or are Internet shortcuts to functions of the CUI. In FIG. 2, the menu includes listings for edit 56, package 58, CUI 60, and help 62.

The application window also displays a package manager 64 that lists all document activities initiated during an application session. The package manager is an area, or set of fields in the body of the application window which lists all document activities that have been initiated during a send client application session. When the send client application is first launched, the package manager field is empty. However, as documents are sent, they are listed in the package manager.

Figure 3:
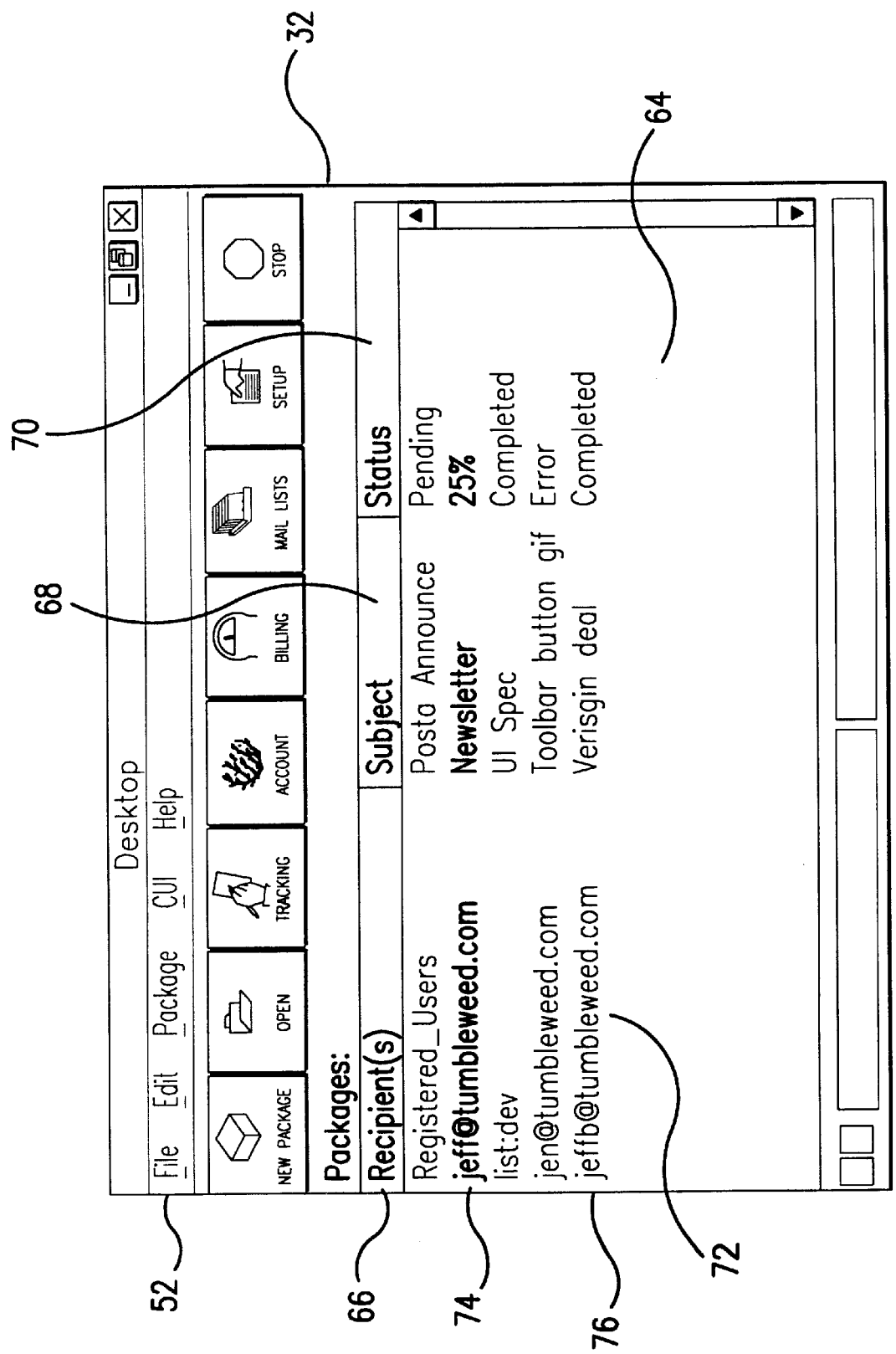
FIG. 3 is a view of an application window showing document activities according to the invention.

FIG. 3 is a view of an application window 32 showing document activities 72 according to the preferred embodiment of the invention. The package manager may display the recipient(s) 66, the subject 68, and the status 70 of the delivery.

The status of an active delivery may be represented as a dynamic percentage of upload completed. Other possible status labels include "completed," "error," "pending," and "on hold."

Documents may be listed, for example, in processing, or reverse processing orders. In the preferred embodiment of the invention, the document currently being processed 74 is presented in bold characters. In alternate embodiments, the current document is indicated by other means, including highlighting, flashing, or color, or is unmarked.

Clicking on a listed document 76 highlights that listing and selects the document. Multiple documents may be selected at one time. Once a document is selected, the user can use the menu 52, for example, to hold, edit, or delete the document.

A hold prevents a pending document from being processed. The document is held in a queue until it is deleted or the hold is removed. In the preferred embodiment of the invention, any or all documents in the list can be deleted. A current send is completely aborted, and an already-processed document is deleted from the window.

Editing opens a document within a new package window (discussed below). The user can then edit the document and re-submit it for sending. If a document is edited in transmission, the transmission is aborted. The document is opened in a new package window, and the next pending document is transmitted.

Figure 4:
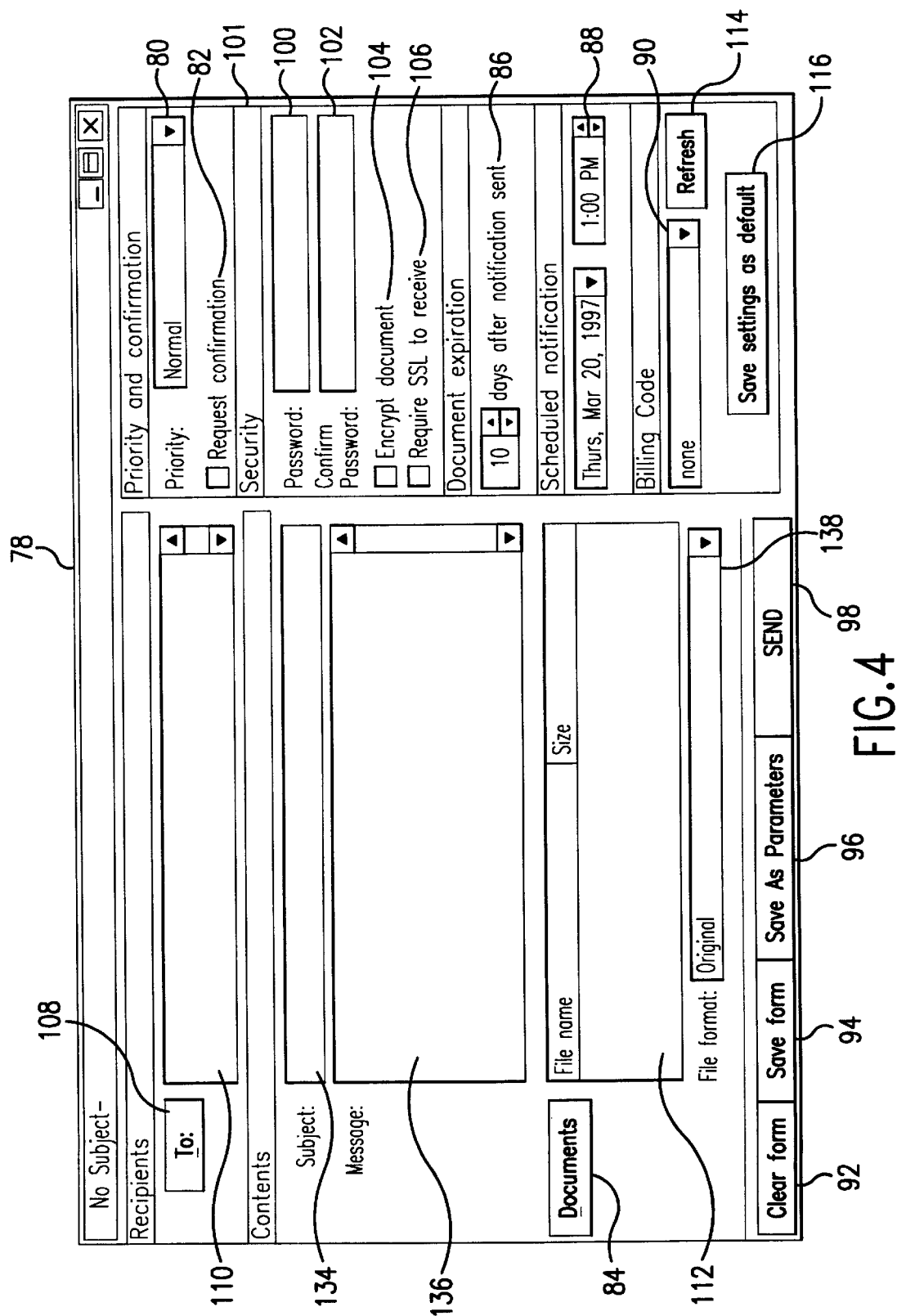
FIG. 4 is a view of a package window, according to the preferred embodiment of the invention.

FIG. 4 is a view of a package window 78 according to the preferred embodiment of the invention. The package window allows the user to specify parameters of the document delivery. A new package window is accessible from the application window, for example, by menu or tool bar selections. A package window may be saved and opened at a later time. Additionally, a package window is opened when a user sends (prints) a document from a document authoring application to the send client application.

Each document delivery transaction requires the sender to specify the recipient(s) of the delivery, the document(s) to be delivered, and the delivery options. Such delivery options include priority 80, request confirmation 82, document expiration 86, scheduled notification 88, and billing code 90. The preferred embodiment of the invention includes selectable buttons such as clear form 92, save form 94, save parameters 96, and send 98.

Any number of recipients or mail lists for a given delivery are specified in the "To:" field 110 of the package window. Each recipient must be specified by an E-mail address, alias, or mail list. The user may type an address directly into the "To:" field. Alternatively, the user may access a recipients window by clicking on the "To:" button 108.

The subject of the message is entered into the subject field 134. The message itself is entered into the message field 136. The subject 134 and message 136 fields are optional. In the preferred embodiment of the invention, the subject appears in the E-mail notification message and on an HTML cover page for the downloaded document. The message appears only in the E-mail notification.

The documents field 112 in the package window allows the user to specify any number of documents to be delivered. A document is specified in several ways. The user can click and drag the document from the sending computer desktop onto one of the application window, the package window, or onto either the icon representing the send client application, or the icon for accessing the stored document delivery parameters.

Clicking the documents button 84 in the package window allows the sender to browse local and network directories and select desired documents. If the package window is invoked from a document authoring application, the document field is automatically filled in with the current active document.

A file format field 138 allows the user to specify in what electronic format the document is saved. The send client application is readily adapted to support different formats, such as Mac Binary, Envoy, PDF, Dynadoc, and HTML. For example, a document created in a word processing application operable on one platform can be saved in the format of another word processing application operable on a different platform.

Each delivery transaction has associated send options. In the preferred embodiment of the invention, all options have default settings which can be changed by the user prior to delivery. Settings are viewed and edited in the package window.

In the priority field 80, a user specifies the priority of a delivery, for example, as normal, low, high, or urgent. Priority determines the order the document is processed by the client as well as by the dedicated server.

The request confirmation field 82 is used to prompt the recipient to confirm whether or not a document was successfully received. Request confirmation can be selected or de-selected, as desired.

The security dialog 101 allows the user to specify varying levels of advanced security measures. These levels include specifying a password 100 for basic password protection, or requesting confirmation of a password 102. Additional security provisions, such as encryption 104 or requiring the recipient to use SSL to receive 106 the document, can also be provided. If the user requires the recipient to use SSL and is not using a secure connection between the sending computer desktop and the dedicated server, the recipient is asked whether or not to secure the connection to the dedicated server.

The document expiration field 86 allows the user to specify how long a document will remain on the dedicated server for recipient availability. A default, such as ten days after notification is sent, may be provided.

The scheduled notification field 88 allows the user to specify a future date and time that the dedicated server will notify the user of a given delivery. The billing codes dialog 90 allows the user to select an optional billing code from a list associated with the user's send client application account. In the preferred embodiment of the invention, a cached list of billing codes is available. A refresh button 114 refreshes the list with the latest billing code list on the dedicated server.

Once the user has specified delivery parameters in the package window, the user initiates the document delivery by clicking the send button 98. A delivery is initiated only if both the recipient and the document fields are entered correctly. The send button is not active until both such fields are complete. If the user is working off-line, sent documents are queued for sending when the connection is eventually established.

Addresses are matched first against the current local address book. If the addresses are still not matched, they are uploaded to the dedicated server as is. The dedicated server then attempts to match addresses with a mail list. If the address is still not matched, the dedicated server appends the domain name of the account holder.

A partially completed package window may be canceled or saved using the save form button 94. The saved package window may then be re-opened for future use.

Saved delivery parameters can be used on a recurring basis across sessions. From a package window, a user can save delivery parameters including specified send options, an address list, and/or a fixed subject or message. To save delivery parameters, a user clicks on the save parameters button 96. A dialog box prompts the user to specify a name and location for the delivery parameters to be saved.

If the saved delivery parameters contain an address list, the user can initiate a delivery by clicking and dragging a document icon onto the saved delivery parameter icon. The document provides the remaining information required for a delivery, and the send is initiated automatically. The saved delivery parameter thus serves as a dedicated mail chute to a specific set of recipients.

The existing send options may be modified or confirmed before launching the delivery. A window displaying all send parameters is opened, and the user can modify parameters or append a message before sending the document. In the preferred embodiment of the invention, the user is prompted to save any modifications to send options or existing address lists upon closing the package window.

If the saved delivery parameters do not include an address, clicking and dragging a document onto the saved delivery icon opens a package window. The saved send options and name of the document are specified in the package window. The user must specify a recipient before the document can be sent.

Saved delivery parameters are opened by clicking on the associated icon, or by selecting the appropriate main tool bar 34 or menu items. The settings are displayed in a package window and are completed or modified for a delivery. If the send client application is not open, opening the saved delivery parameters opens the application window as well as a package window. Modifications to the saved delivery parameters are preserved by replacing the existing saved parameters, or by creating a new saved delivery parameters file under a different name.

If unsaved changes have been made to the saved delivery parameters, the user is prompted to save the changes upon closing the package window. A sender can add an address list to an existing saved delivery parameter that did not previously contain an address list. The settings of the package window are saved using the "save settings as default" button 116.

Figure 5:
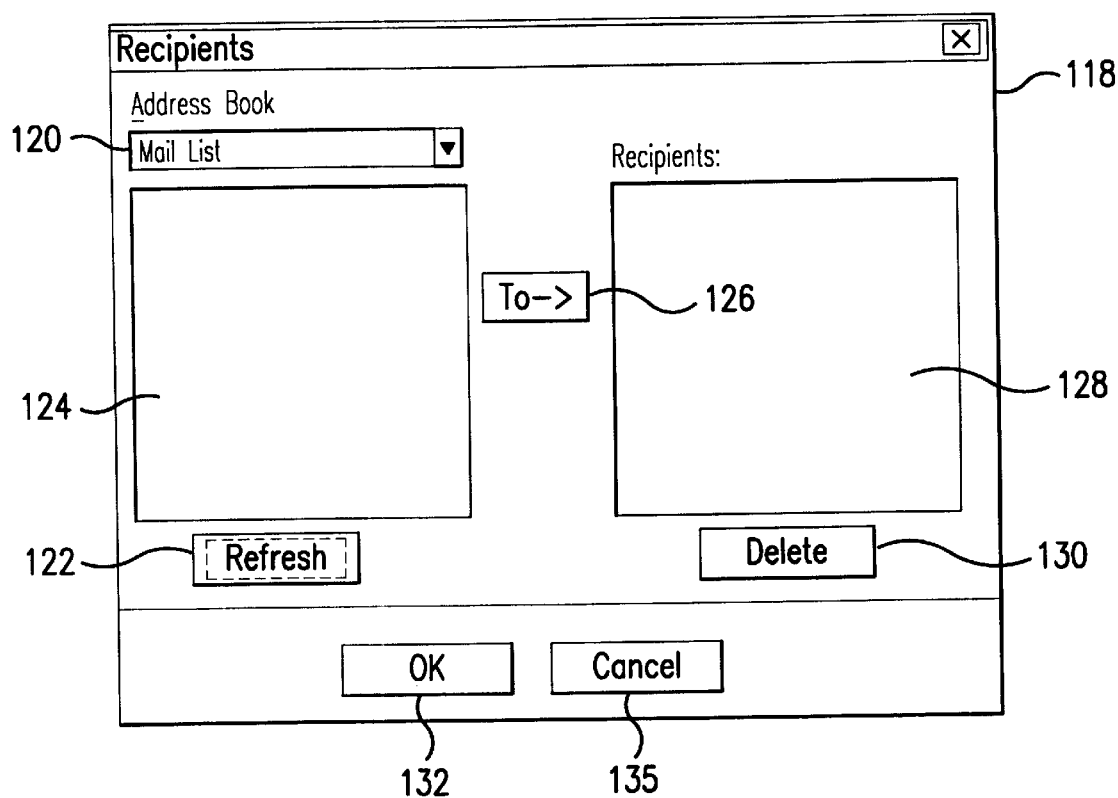
FIG. 5 is a view of a recipient's window according to the invention.

FIG. 5 is a view of a recipients window according to the preferred embodiment of the invention. The recipients window 118 is used to select the recipient's name from an address book or pre-defined mail list.

In the preferred embodiment of the invention, a pull-down menu 120 allows the user to access addresses in a local address book or a mail list. For example, selecting mail list in the pull-down menu and clicking on the refresh button 122 populates the list box 124 with the names of the mail lists stored on the dedicated server for the account for which the send client application is configured. Selecting local address book and clicking on the refresh button populates the list box with addresses from the address book specified in the preferences dialog.

Each time the recipients window is opened, the send client application displays a previously cached list of addresses. Clicking on refresh forces a refresh of the list from the appropriate source. The send client application presents the last-selected source for the next send, both within and across sessions. The cancel button 135 cancels the recipients window display.

A user can select items from the list box 124 and click the "To" arrow button 126 to specify the selections as recipients. In the preferred embodiment of the invention, control-click allows selection of multiple items and shift-click selects a range of items. Recipients are presented in the recipients box 128. Recipients listed in the recipients box list are selected and removed by clicking the delete button 130 or by hitting keyboard backspace or delete keys.

When the user clicks on the "OK" button 132, items in the recipients box list are displayed in the "To:" field 110 of the package window 78 (see FIG. 4). In the preferred embodiment of the invention, mail lists have the prefix "list:" prepended to them. A user can also delete or modify recipient addresses from the "To:" field of the package window.

The specified document delivery parameters may be stored in a storage module for later modification and/or use. In the preferred embodiment of the invention, the send client application and the package window are accessed by selecting their representative icons (not shown) from the sending computer's desktop.

Figure 6:
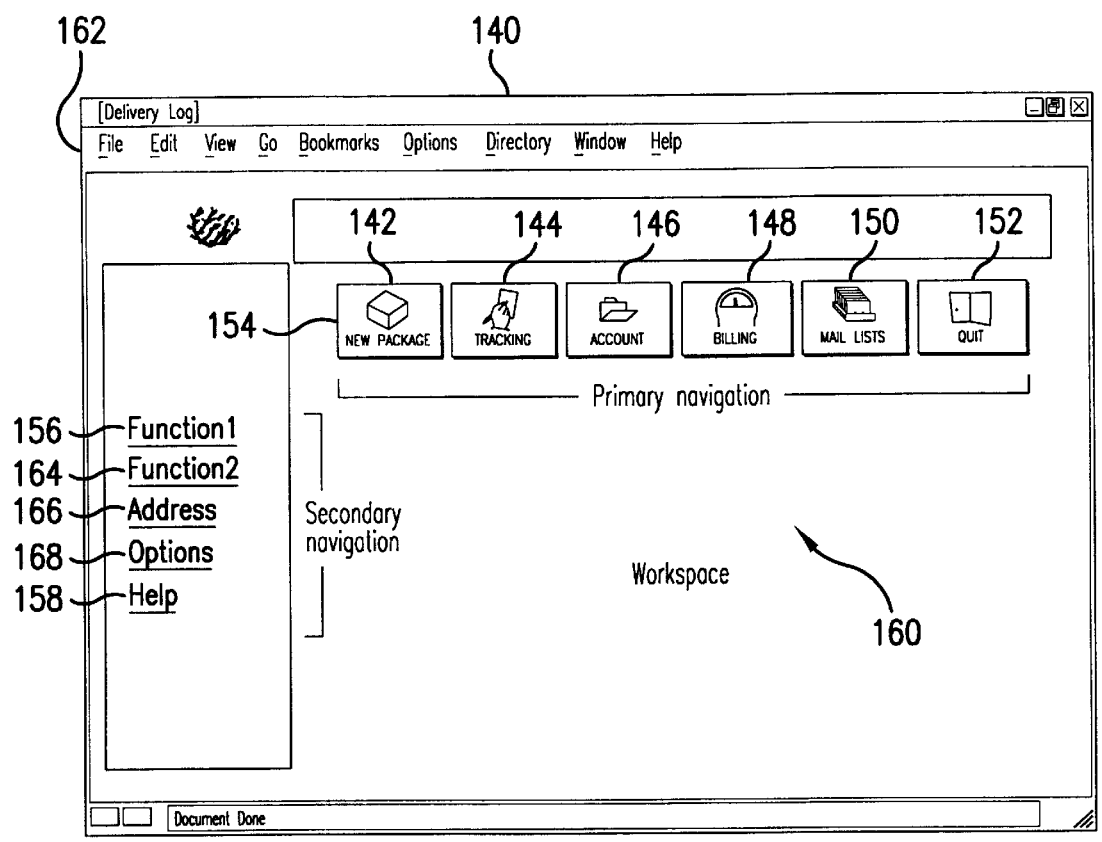
FIG. 6 is a view of a CUI application window according to the invention.

A configuration user interface is provided for directly invoking and customizing the dedicated server. The CUI is accessed via a CUI application window displayed on a managing computer desktop. Alternatively, the CUI is accessed through any Web browser application that supports tables, or accessed through the send client application. FIG. 6 is a view of a CUI application window 140 according to the preferred embodiment of the invention.

In the preferred embodiment of the invention, the CUI is an HTML interface for invoking and customizing the dedicated server via a Web browser. This HTML interface includes modules for sending the document, tracking the document, accessing information associated with the document delivery account, managing billings for the document delivery, and managing mail distribution lists.

The CUI offers different sets of functions, depending on the user and type of account used. Individual account holders, group account managers, and group members see slightly different interfaces and are able to access and manipulate varying sets of data. When a user initiates a CUI session, the type of account is identified by the dedicated server. The specific user is then provided with the appropriate functions and data.

In the preferred embodiment of the invention, individual account holders and group account managers have access to all delivery and account information associated with the account. Account managers therefore have access to information regarding activities of all group members using the account. Account managers are additionally authorized to create and manage member accounts. Group members have access only to information regarding the members own delivery services.

The managing computer can be the sending computer, the receiving computer, the dedicated server, or some other computer in the electronic network. The CUI includes five main functions, new package 142, tracking 144, account 146, billing 148, and mail lists 150.

In the preferred embodiment of the invention, these main functions are displayed as selectable buttons 142, 144, 146, 148, 150 on a persistent main tool bar 154. In FIG. 6, this main tool bar is displayed in a horizontal orientation, and also includes a quit button 152. However, alternative embodiments display different configurations of the application window. A secondary tool bar 156 is provided for accessing and navigating secondary functions 164 within the main functions. In FIG. 6, the secondary tool bar is displayed in a vertical orientation. However, this configuration is for exemplary purposes only. The invention may be implemented readily to display different orientations of the main and secondary toolbars.

The secondary navigation on the secondary tool bar 156 for the CUI application window 140 includes address 166 and options 168. A help button 158 included on all secondary toolbars is used to access on-line help for the current function.

The CUI application window also includes a workspace 160 for displaying an interactive interface to an accessed function. A menu 162 lists operational commands for the CUI.

A send function mirrors that of the send client application. The send function is accessed from the new package button 142. This send function allows users to send documents from remote locations using any browser. The send function also allows documents to be sent from platforms not supported by the send client application. In the preferred embodiment of the invention, saved delivery parameters, Envoy conversion, and access to local address books are not available.

Figure 7:
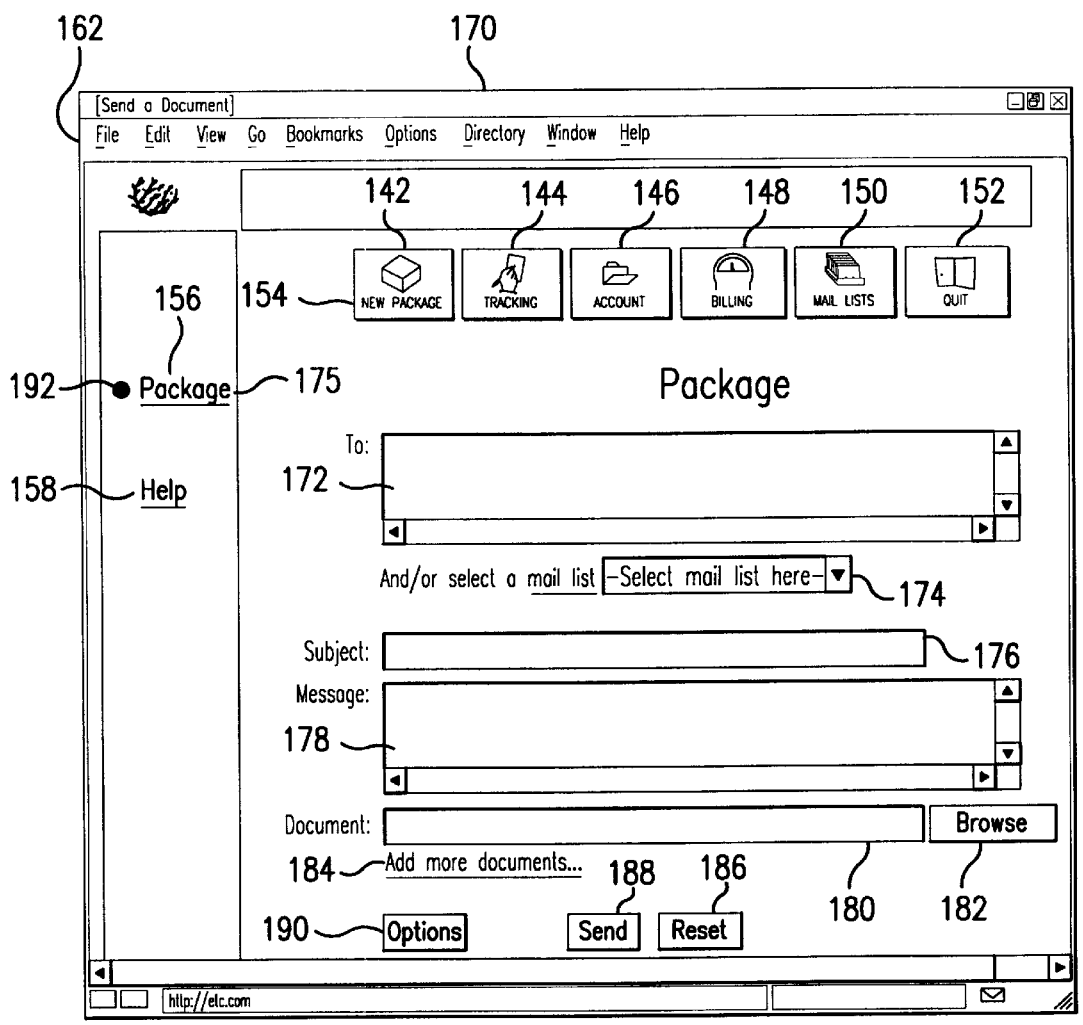
FIG. 7 is a view of a CUI package window according to the invention.

Clicking on the new package button to access the send function brings up the package window. FIG. 7 is a view of a CUI package window 170, according to the preferred embodiment of the invention. The current function is indicated by an item 192 in the secondary tool bar.

For a given delivery, a user can manually enter names into the "To:" field 172. A mail list may also be selected from a pull-down menu 174. The user may thereby view and manipulate mail lists. In the preferred embodiment of the invention, the user does not have access to a local E-mail address book.

If an item entered in the "To:" field 172 does not contain proper domain formatting (e.g. the "@" is omitted), the item is compared to the mail lists by the Server. If the item is not located in a mail list, the server appends the sender's domain name to the end of the item.

A sender inputs text into the subject 176 and message 178 fields. The sender may specify a document to be sent by typing the name of, and path to the document into the "Document:" field 180. Alternatively, the document may be specified by clicking the browse button 182 and browsing to select a document from a local or network directory.

To send multiple documents, the sender clicks on the "add more documents . . . " link 184. The sender is then presented with a window (not shown) having the same format as the new package window, with the addition of four additional "Document:" fields and browse buttons. The information already entered on the previous CUI package window 170 is carried over into the new window. Thus in the preferred embodiment, a sender may specify up to five documents. In alternative embodiments, any number of documents may be specified. The reset button 186 clears all fields in the window to their defaults. The send button 188 is used to initiate the delivery of the document with the default options. If the information input into the address form is incomplete or incorrect, the invention displays an error page (not shown) to the sender. The invention may also prompt a sender for a document's mimetype if it is not recognized. A mimetype specifies the format of a document, and is used by the recipient-browser to bring up the corresponding application to display the document. In the preferred embodiment, the error page is directly edited, and the new information directly submitted. When the send is complete, a notification page (not shown) is displayed to the sender.

Figure 8:
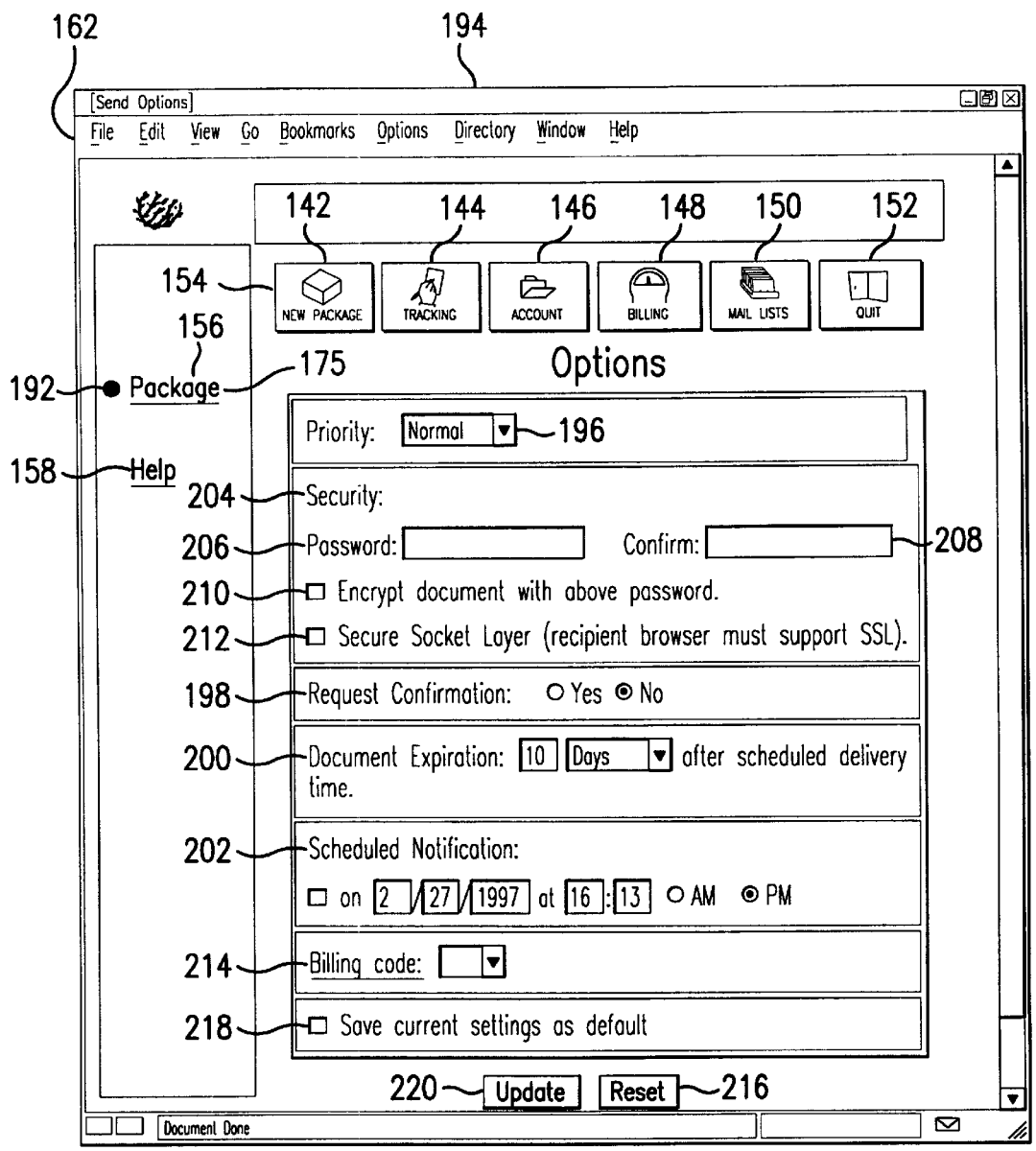
FIG. 8 is a view of a CUI options page according to the invention.

In the preferred embodiment of the invention, the CUI includes most of the send options of the send client application (see FIG. 4). These send options are accessed by clicking on the options button 190 to open a CUI options page. FIG. 8 is a view of a CUI options page 194 according to the preferred embodiment of the invention. Such options include priority 196, request confirmation 198, document expiration 200, and scheduled notification 202. However, because the send client application driver is not available from the server, certain send client options such as document type are not implemented. A document is therefore sent in the document's original format only.

A security function 204 is incorporated into the preferred embodiment of the invention. The preferred embodiment of the invention supports security and encryption features permitted under current law for use in the United States. Alternative embodiments of the invention comply with any security and encryption requirements for software applications intended for export from the United States.

The CUI user may specify a password 206 that a recipient must provide to access a document. The user may also specify confirm password 208, encrypt document 210, and require SSL to receive 212. The password may be used as a secret key to encrypt the document on the server. This provides a higher level of security while the document is stored on the server. If the encrypt document function 210 is selected but the user has not specified a password, the CUI transmits an error message when the user attempts to apply the settings.

The billing code option 214 allows users to select a billing code, including "None" from a pull-down menu. The list is defined and maintained in the billing module of the CUI (see FIG. 15). The "Billing Code" text link brings users to the billing section of the CUI. Users may thereby view and manipulate billing codes.

Clicking on the reset button 216 restores the default settings. Alternatively, the current settings may be saved 218 as the default. Once the options are set, the user uses the Update button 220 to return to the package window 170. A delivery is then initiated by clicking on the send button 188.

Tracking is accessible from the tracking button 144 on the persistent main tool bar 154. The tracking search function is used to query the CUI database for information about deliveries sent from an account. A sender can therefore find out whether a recipient has received a particular document. The database archive can also be searched for records of past transactions.

Figure 9:
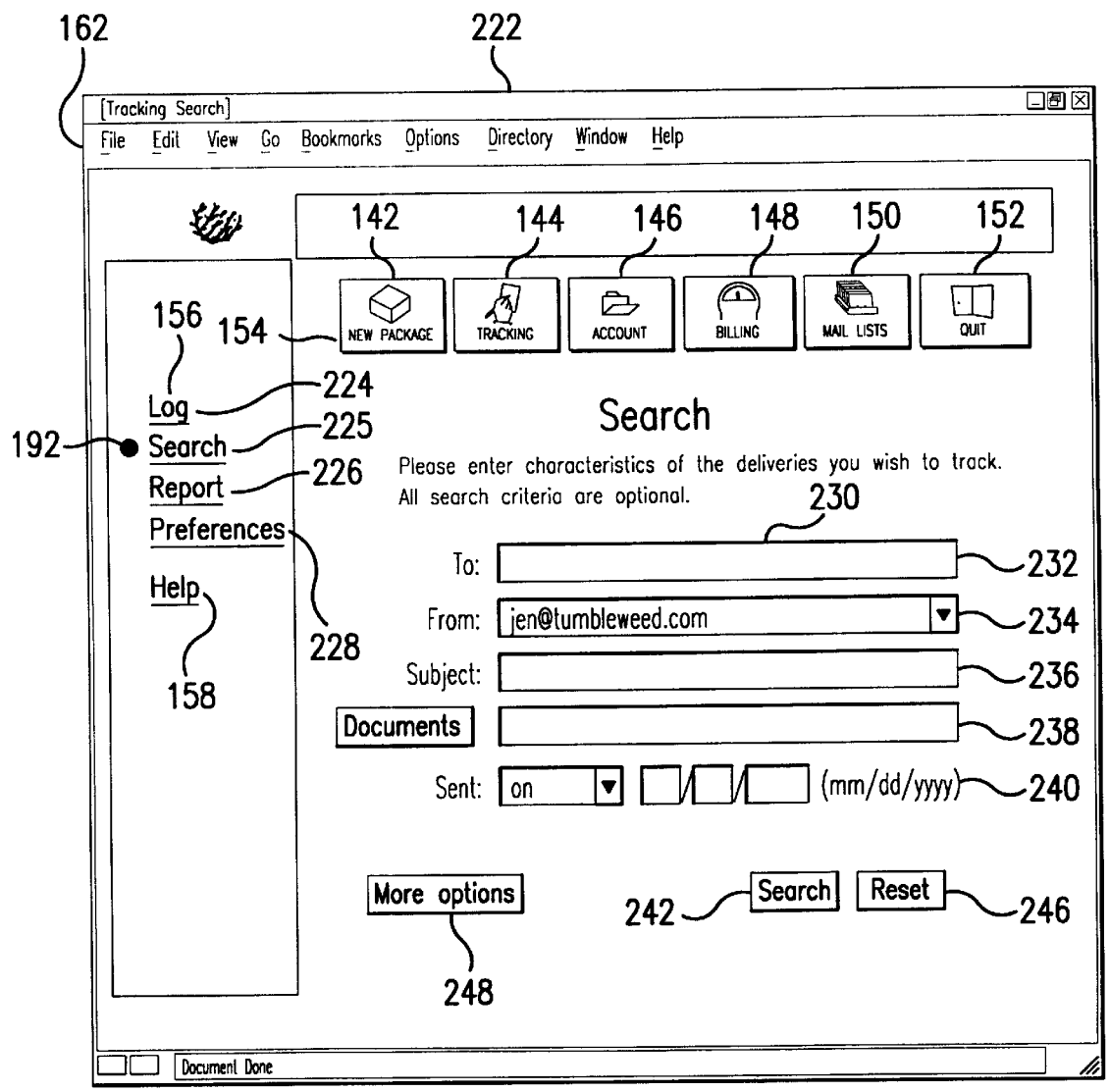
FIG. 9 is a view of a CUI tracking search page according to the invention.

FIG. 9 is a view of a CUI tracking search page 222 according to the preferred embodiment of the invention. The secondary navigation from the secondary tool bar 156 includes log 224, report 226, preferences 228, and help 158. The current function 192, search, is identified. The tracking button on the main tool bar displays a record of all deliveries sent from the account as a delivery log (not shown).

Account managers are permitted to track all deliveries initiated from a group account. Group members are permitted to track only those deliveries initiated personally by the member.

Figure 10:
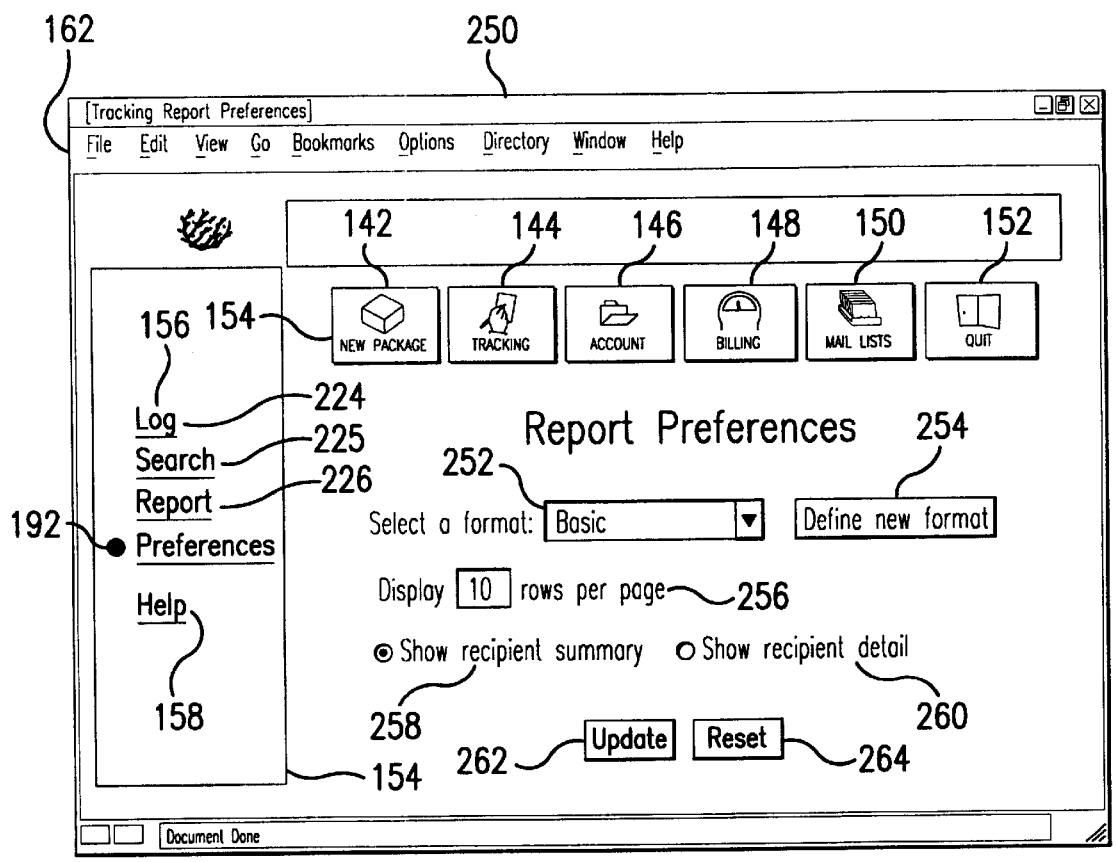
FIG. 10 is a view of a CUI tracking report preferences dialog according to the invention.

The format of the delivery log is specified in tracking preferences (see FIG. 10). The format chosen applies to both the delivery log and the tracking report (see FIGS. 11–13). The preferred embodiment of the invention includes navigation buttons to permit the user to access previous, or subsequent log pages. Information regarding an individual delivery may be displayed on the delivery log, along with an indication of the total number of deliveries logged.

The subject of each listing in the log links to a package detail report (not shown) about the specific delivery. A detail report contains send parameters of each delivery, including a link to the document if not expired, the mimetype, and the message. The detail report also contains the status of the delivery to each recipient, and the charges applied to the transaction. Users can click on log 224 on the secondary tool bar 156 to return to the top level log.

The search function allows users to pinpoint information about, and the status of, a specific delivery or set of deliveries. The user specifies any combination of search criteria to identify the deliveries of interest. If multiple criteria are specified, the search engine performs a logical "AND" search among all the criteria.

In the preferred embodiment of the invention, the search page graphical user interface (GUI) is simplified. A short list 230 of common searchable fields is presented on the Search page. The short list contains five search criteria:

The "To:" field 232 allows a user to search by the intended recipient's full or partial E-mail address of the recipient. Partial e-mail addresses allow the user to search by domain name.

The "From:" field 234 allows an account manager to search according to the originator of the delivery. The account manager selects a member's e-mail address from a pull down menu. For group members and individual account holders, this given user's e-mail is provided and cannot be changed.

The "Subject:" field 236 allows a user to enter keywords which may be found in the subject field of a document.

The "Document:" field 238 allows a user to perform a text search on the name of the document. A user can type in the name of the document, or browse through the list of documents to select a document.

The "Send date:" field 240 allows a user to search for deliveries sent on, before, or after a specific date.

Clicking on the search button 242 initiates the query and returns a report with all deliveries matching the query. Clicking on the reset button 246 clears the form to its default setting.

Clicking on a "More Options . . . " button 248 at the bottom of the short form brings the user to a page having a second, expanded list (not shown) of searchable fields, including all fields from the short list. In the preferred embodiment, the additional fields in the expanded list include:

The billing code: field allows a user to select from a pre-defined list in a pull-down menu.

The "Delivery status:" field allows a user to select from a menu of delivery statuses. Delivery status options include: any, received, not received (includes both failed notification and not picked up), confirmed, not confirmed, pending notification and failed notification. The user may also search document expiration, scheduled notification date, receive date, and message fields.

The search results are presented in a tracking report. The tracking report is presented as a table in a format specified in the tracking preferences dialog. FIG. 10 is a view of a CUI tracking report preferences dialog 250 according to the preferred embodiment of the invention.

The Dialog permits the user to select a document format 252, or to define a new format 254. In the preferred embodiment of the invention, a user can select from two pre-formatted reports, basic format and billing code format. Both summary and detail information reports are available in each format.

The dialog allows the user to specify the number of rows per page 256. Additionally, the user selects whether to show recipient summary information 258, or detail information 260.

Clicking on update 262 saves all changes and returns the user to the report or page from which the user accessed the tracking report. If the user returns to a report, it is displayed with the new preferences settings. The dialog is reset using the reset button 264.

Figure 11:
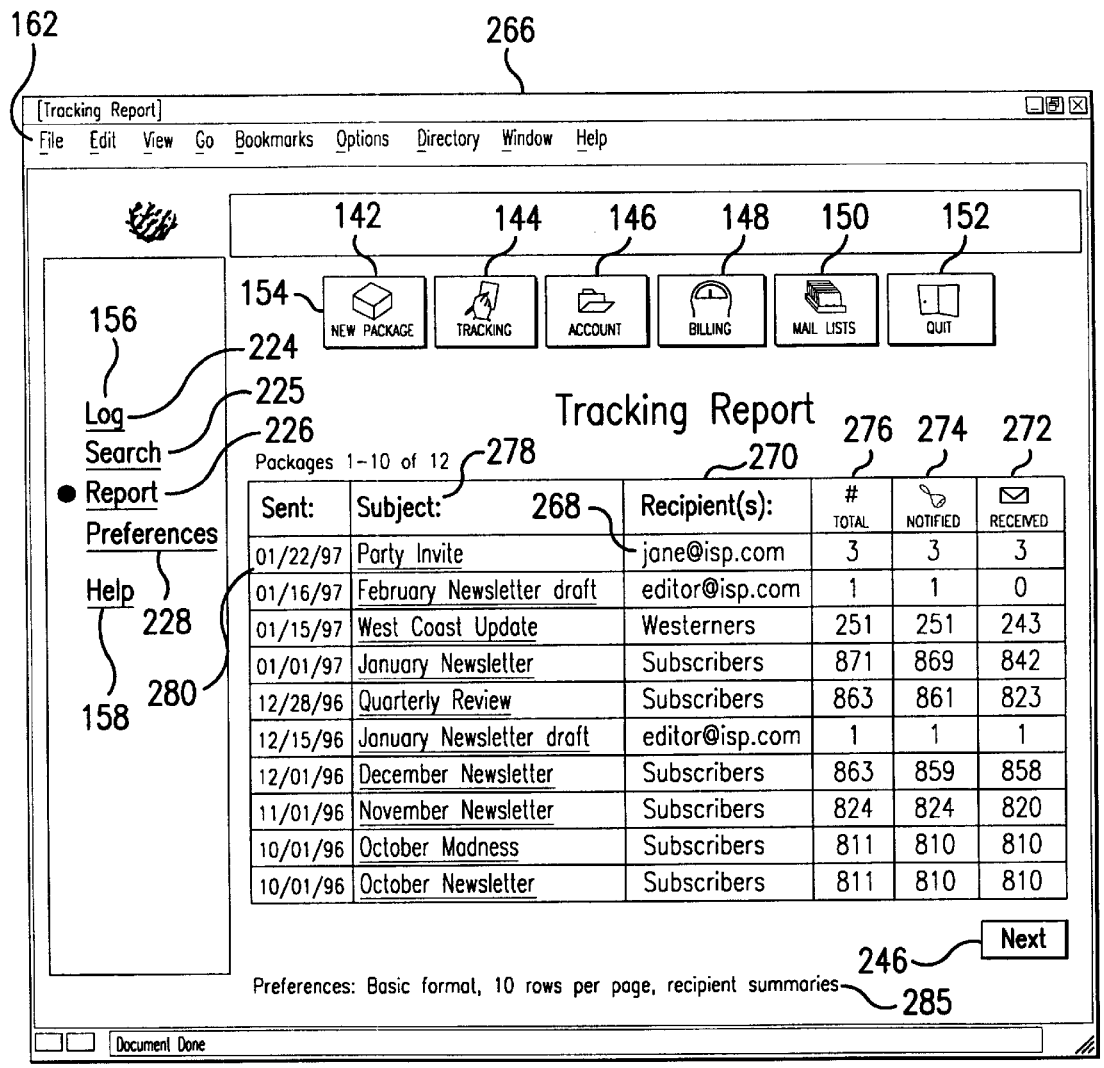
FIG. 11 is a view of a recipient summary tracking report in basic format according to the invention.

FIG. 11 is a view of a recipient summary tracking report in basic format 266 according to the preferred embodiment of the invention. When search results are displayed, the secondary navigation in the secondary tool bar 156 indicates that the sender is in report mode. The elements and behavior of the tracking report are consistent with those of the delivery log.

In the preferred embodiment of the invention, the deliveries are sorted by date and presented in reverse chronological order. However, in alternative embodiments, the deliveries are presented in chronological order, or are sorted, for example, by recipient. The next page of delivery listings is accessed by clicking on the next button 284.

A recipient summary tracking report lists, in the "Recipient(s):" field 270, only the name of the first recipient 268 of a particular delivery, or the first recipient on the mail list to which that delivery was sent. An indication ( . . . ) is placed next to the name if there are more names on the list. The number of recipients of the delivery is listed in the "Received:" field 272 and the number notified is listed in the "Notified:" field 274. This information is totaled 276 across all recipients.

For example, the most recent delivery shown in FIG. 11 is the party invite listed in the "Subject:" field 278. The date the party invite was sent was Jan. 22, 1997, as is indicated in the "Sent:" field 280. The tracking report shows that a total of three party invite documents were sent. All three recipients were notified, and received the document. Only the first recipient 268, "jane @isp.com," is listed in the "Recipient(s):" field 270.

Figure 12:
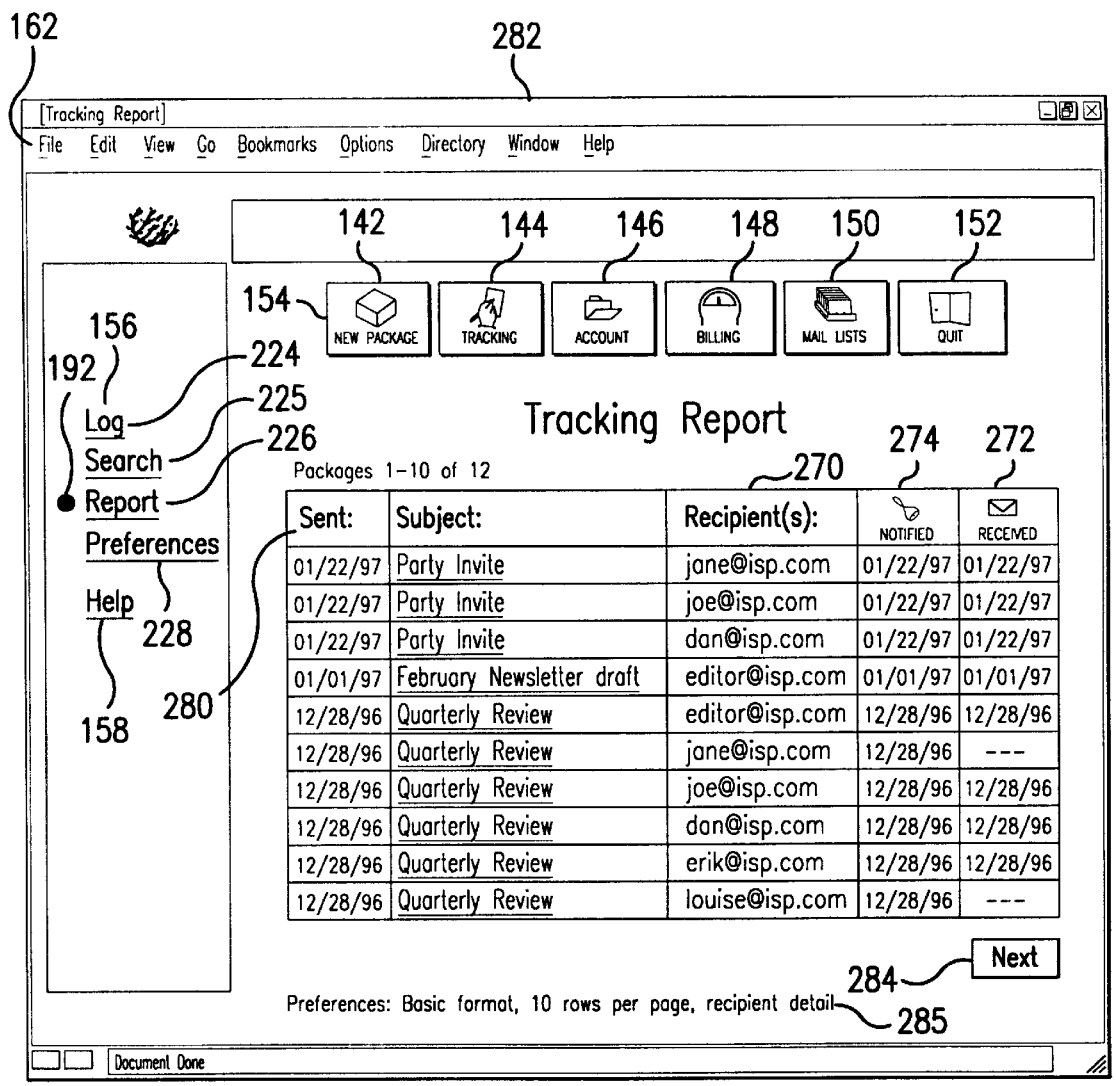
FIG. 12 is a view of a recipient detail tracking report in Basic Format according to the invention.

FIG. 12 is a view of a recipient detail tracking report in basic format according to the preferred embodiment of the invention. A recipient detail tracking report 282 lists in the "Recipient(s):" field 270 each recipient of each delivery. The "Received:" 272 and "Notified:" 274 fields list the specific dates that each recipient was notified of, and received the delivery. For example, FIG. 12 separately lists the three recipients of the party invite, and their notification and receipt dates.

The recipient detail tracking report also expands every mail list. In the preferred embodiment of the invention, mail lists are only expanded for deliveries that have been processed. Future scheduled deliveries and deliveries in progress are indicated as such.

Figure 13:
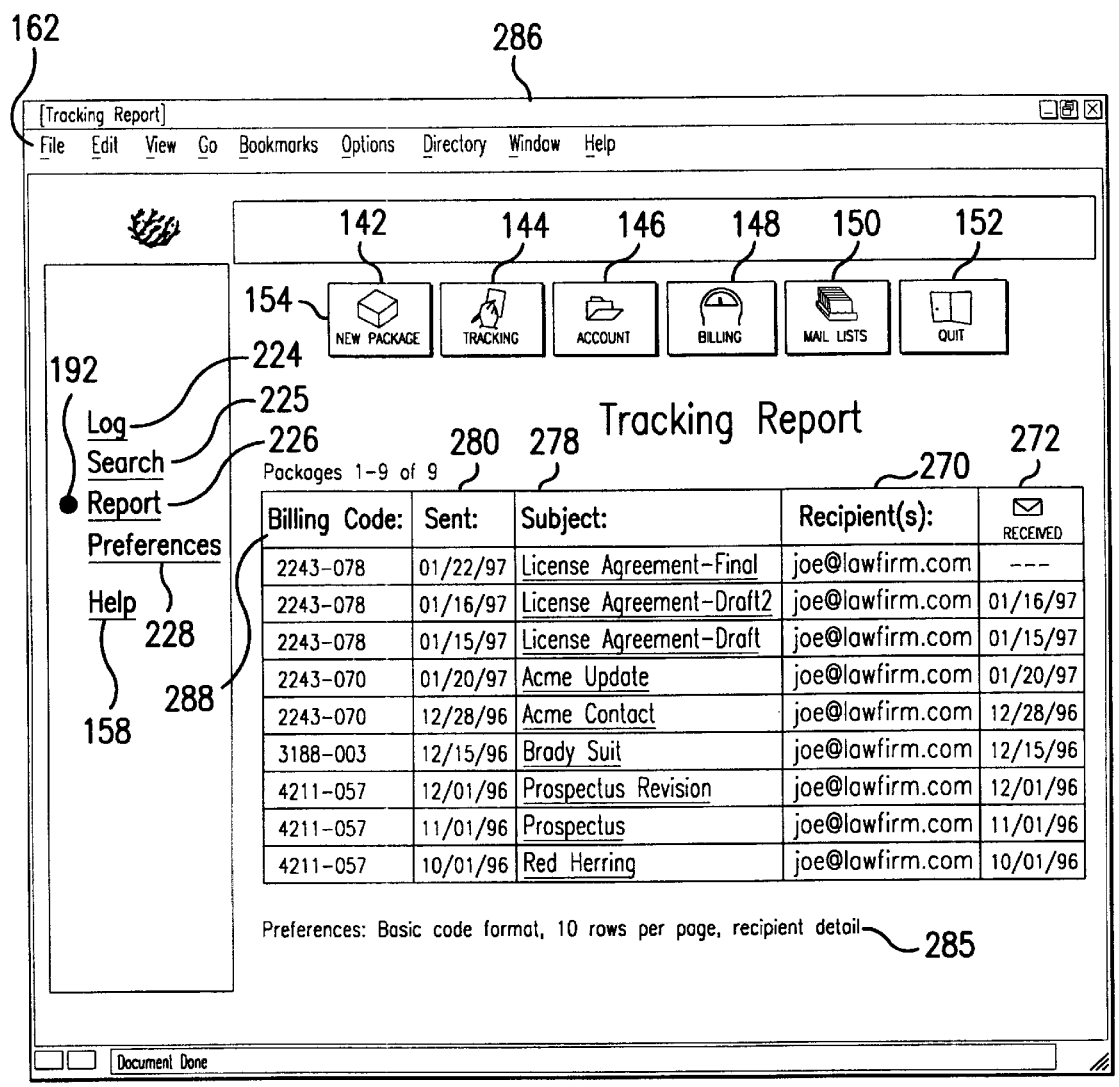
FIG. 13 is a view of a recipient detail tracking report in billing code format according to the invention.

FIG. 13 is a view of a recipient detail tracking report in billing code format 286 according to the preferred embodiment of the invention. The billing code format displays the billing code 288 and sorts results by billing code and date.

The CUI account management functions are available from the main tool bar button labeled "Account" 146. Account functions vary according to the type of account and the type of user, such as group account manager, individual account holder, and member account holder. The server software identifies a user's account type and makes the appropriate functions and information available.

All users are able to view administrative account information on record for the respective user's account, including account balance, and can also change their password. Group account managers, however, have extended capabilities. They can edit group members' account information as well as create new accounts. Thus, the secondary navigation of the secondary toolbars displayed to group account managers includes functions such as Information: 302, view members: 304, and add member: 306 (see FIG. 14).

The Information page (not shown) displays basic information about the group account that is stored on the dedicated server. Such basic account information includes:
the name of the account
type of account
date it was created
date it was last accessed
the number of current members out of the maximum allowed.

Account managers can view and manage the current member list via the Members page (not shown).
Account holder information includes:
name of the manager
e-mail address
company name
address The basic account information and the account manager information cannot be edited.

The group account password can be changed from the Information page. The manager enters the existing password and the desired new password, and must confirm the new password. The manager submits the new password by clicking on Update.

In the preferred embodiment, the information page also includes a field which informs the manager when the password was last changed. If the password has never been changed, this field presents the creation date of the account. A link may also be provided to a server manager who is authorized to make changes to accounts.

Figure 14:
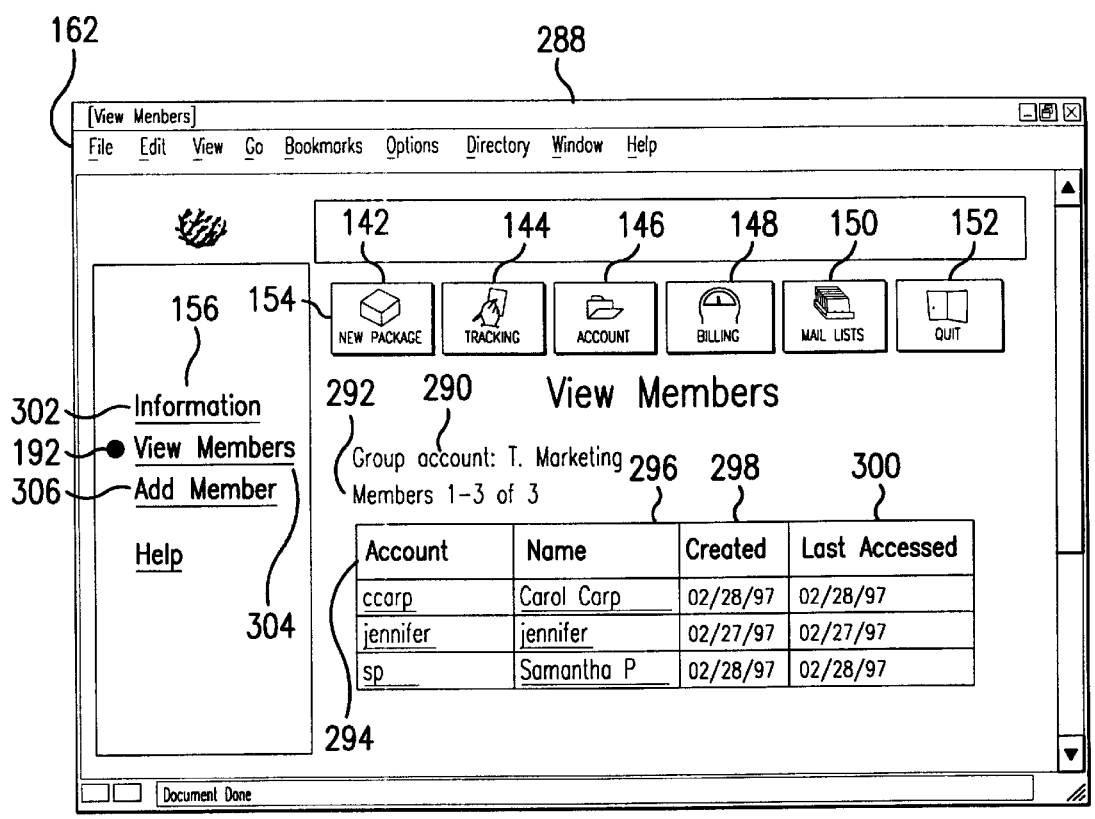
FIG. 14 is a view of a group account manager account—view members window according to the invention.

Managers can view a list of members by clicking on the members text link on the Information page, or by selecting the view members function of the secondary tool bar 156. FIG. 14 is a view of a group account manager account— view members window 288, according to the preferred embodiment of the invention. In one embodiment, managers use a link (not shown) to Preferences (not shown) where the managers can specify the format, the number of rows per page, and the sorting order of the View Members table.

The view members page displays the name 290 of the group account, and the number 292 of the members displayed out of the total number. The list of members includes the account manager, and is presented in a table which lists the member account names 294, the member names 296, the date created 298, and the date last accessed 300. Clicking on a member's name brings up a "Mailto:" box (not shown), pre-addressed to the member.

Clicking on the account name allows managers to view and edit individual member account information. This information is displayed on a member account information page (not shown) which is similar in format to the group account information page. Basic member account information includes the following (editable information is noted):
group account
member account (editable)
date created
date last accessed
  Member information
member name (editable)
e-mail address (editable)

Managers cannot view the member's password, but can change the password on the member account information page by specifying a new password and confirming it. The date of the last password change (not shown) by either manager or member is also displayed. Any changes made to the information on this page can be submitted by clicking on update (not shown). Reset (not shown) restores the previously stored information.

Member accounts can be completely deleted by clicking on a delete button on the member account information page. Prior to deleting the account, the dedicated server posts a confirmation page notifying the manager of the impending action and requesting confirmation before proceeding. When the member account is updated or deleted, an updated view members window is displayed.

Managers can add members by clicking on the add member link in the secondary tool bar 156. A form (not shown) is displayed prompting the account manager for the information required to create a member account. The form indicates the group account to which the member is added, and the number of the member out of the maximum total members allowed. The information required includes:
member account name (created by the manger)
member's name
member's e-mail address
password (and confirm password)

Clicking on add (not shown) creates a new account and returns the manager to an updated view members window. Clicking on reset (not shown) clears the form.

Because individual accounts have no group members aside from the account holder, such individual account holders do not have member information or functions. The secondary tool bar 156 includes only Information (not shown) and help (not shown.) The information displayed from the account information page is the same as that available from the group account information page, except for the number of current members.

Member account holders also do not have member management functions, and the secondary tool bar includes only information (not shown) and help (not shown). Member account information contains the same basic information as that viewed by managers. However, members are only able to edit e-mail address information.

In the preferred embodiment, members can change their own passwords on the member account information page. They must enter the current password, the new password, and then must confirm the new password. However, in alternative embodiments, members may only be able to change their passwords via the account manager.

Figure 15:
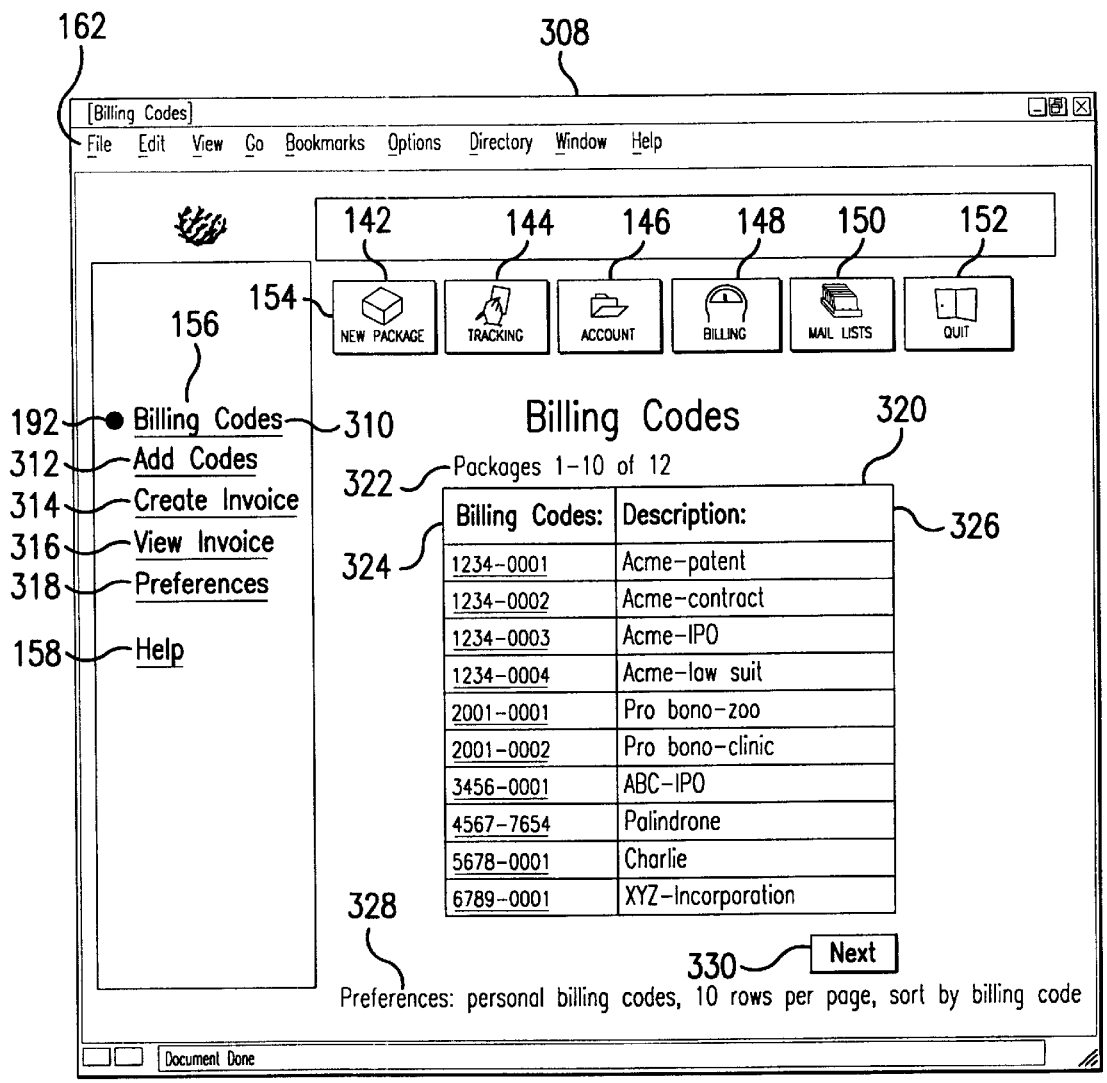
FIG. 15 is a view of a billing codes window according to the invention.

The billing button 148 on the main tool bar 154 gives access to billing code mode management and invoice functions. Clicking on the billing button displays a table 320 of defined billing codes. FIG. 15 is a view of a billing codes window 308, according to the preferred embodiment of the invention. Secondary navigation for billing on the secondary tool bar 156 includes billing codes 310, add codes 312, create invoice 314, view Invoice 316, preferences 318, and help 158.

The table indicates the total number of codes and which ones are currently being viewed 322. In the preferred embodiment of the invention, billing codes are up to 25 characters long and are composed of letters, numbers or characters.

Each billing code 324 has an optional plain English description 326 or name associated with it. In billing preferences (see FIG. 20) the user specifies whether to sort the billing codes by code or by description, and how many rows to display per page. Preference settings 328 are displayed with the table. Next 330 and Previous (not shown) buttons allow the user to view additional pages of billing codes.

Two levels of billing codes are provided for group accounts. The group manager maintains a list of codes that are accessible by all group members. Group members can select their own subset of codes from the group list for easy access to frequently used codes.

Members cannot edit or create billing codes. They must select codes from the list created by the manager to add to their personal list. Members can specify whether to list group or personal billing codes in billing preferences.

Figure 16:
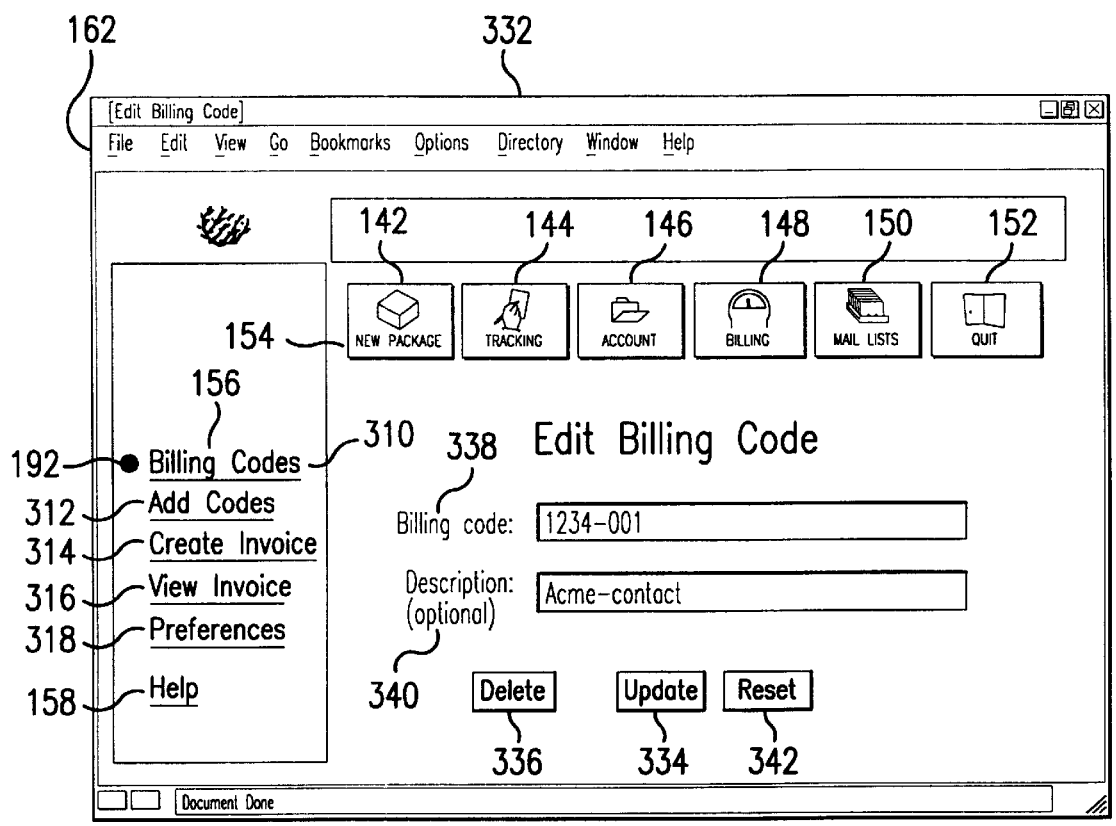
FIG. 16 is a view of an edit billing codes dialog according to the invention.

Clicking on a hot-linked billing code allows users to edit or delete the code or its description. FIG. 16 is a view of an edit billing codes window 332, according to the preferred embodiment of the invention. Users can edit a billing code or description from the appropriate fields 338, 340 in the dialog. The information in the fields is cleared using the reset button 342.

Changes are saved by clicking update 334, which returns the user to the billing code table displaying the updated information. Users may also delete 336 codes and descriptions from this dialog. Because group members cannot edit group billing codes, group billing codes are not hot-linked when viewed by a group member.

Figure 17:
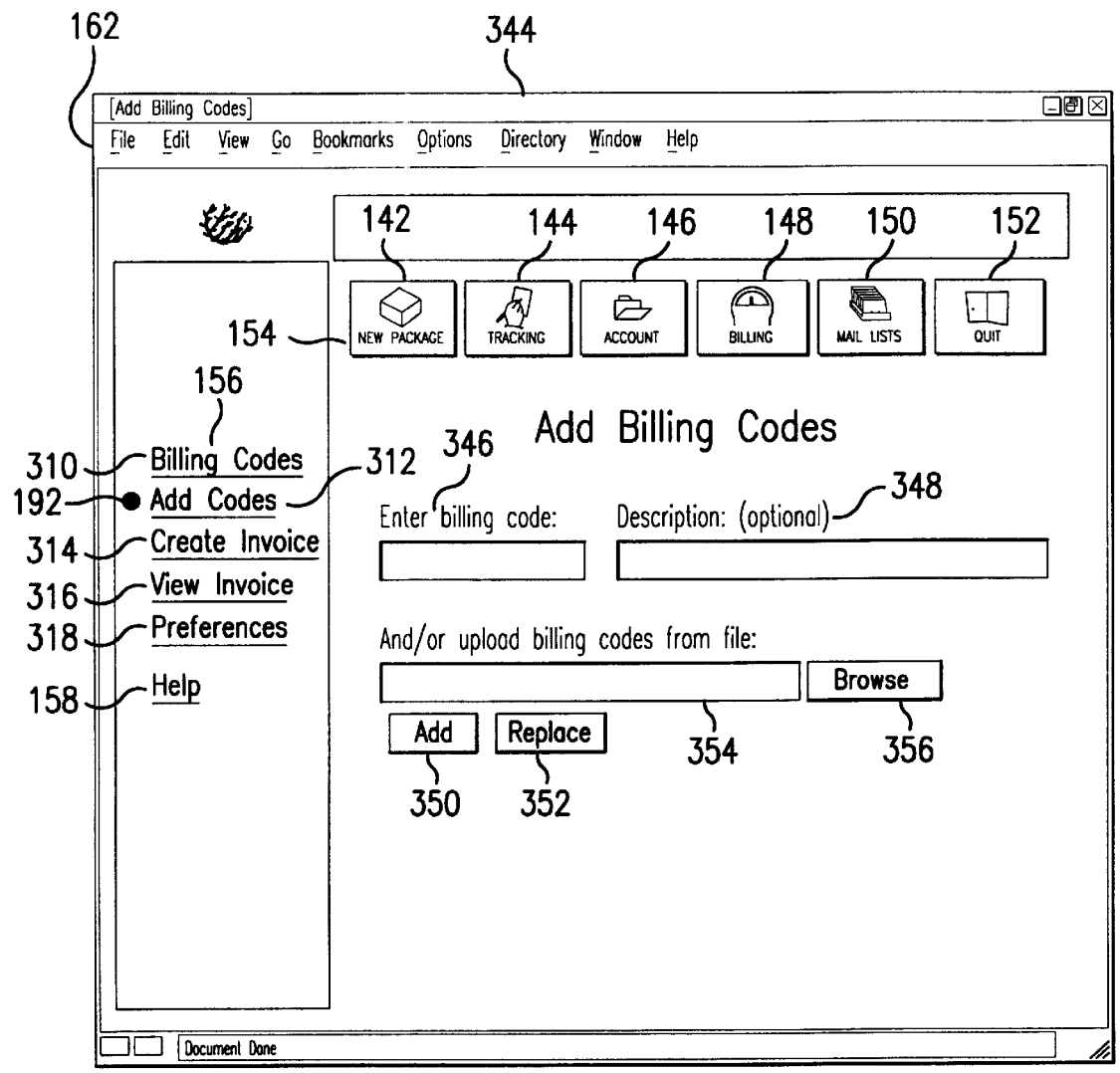
FIG. 17 is a view of an add billing codes dialog according to the invention.

The add codes function 312 in the secondary navigation is used to add items to a personal billing code list. FIG. 17 is a view of an add billing codes dialog 344 according to the preferred embodiment of the invention.

Managers and individual account holders enter a new code into the "Enter Billing Code:" field 346. Any associated optional description is entered into the "Description:" field 348 in the form provided. The add button 350 is clicked to add the new information to the billing code list. The replace button 352 is clicked to replace information in the billing code list.

Billing codes can also be uploaded 354 from a text file. A browse button 356 is used to locate the appropriate text file for uploading. This text file either replaces or is added to the existing billing code list. When new codes are successfully added, the user is presented with an updated billing code list.

Group members can only add codes from the group billing code list to their personal code list. When group members click on add codes, they are presented with a list box of codes from the group list. They may then select multiple codes from the list box. Once the desired codes are selected, the member clicks on the Add button to add the selected codes to their personal list.

Figure 18:
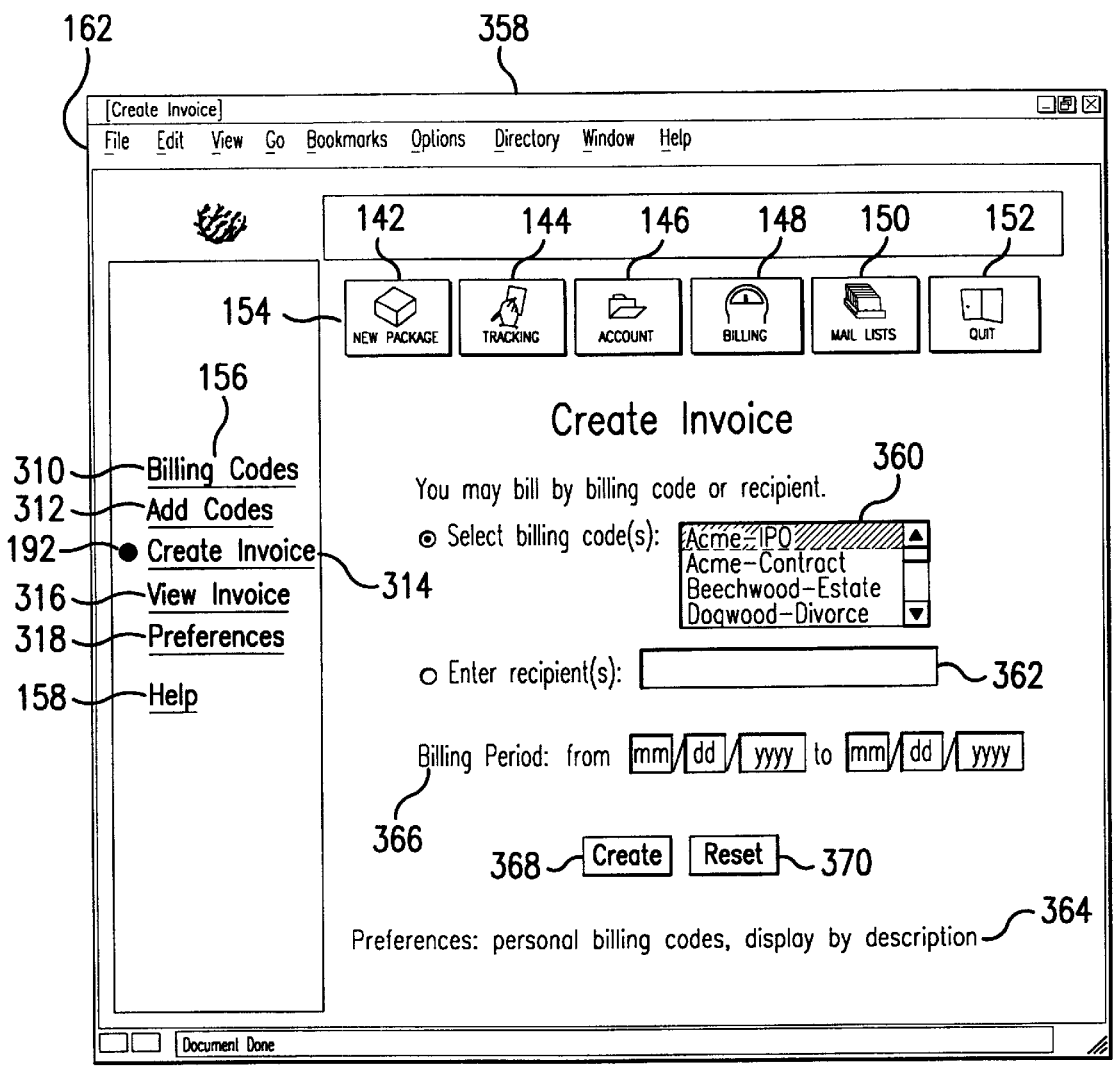
FIG. 18 is a view of a create invoice page, according to the invention.

Clicking on the createinvoice 314 link allows the user to create an invoice. FIG. 18 is a view of a create invoice Page 358, according to the preferred embodiment of the invention. The dialog is a search screen which allows the user to specify which deliveries to bill for the current invoice. Deliveries are billed by billing code or by recipient.

The user selects a billing code or set of billing codes from a list 360 or enters the e-mail address 362 of the recipient. The list contains the billing codes and associated descriptions indicated in billing preferences. Current preferences are displayed 364.

The user also specifies a date range for the invoice's billing period 366. Once the appropriate information is entered, the user clicks create 368 to initiate the query and generate the invoice. Reset 370 clears all entries.

Figure 19:
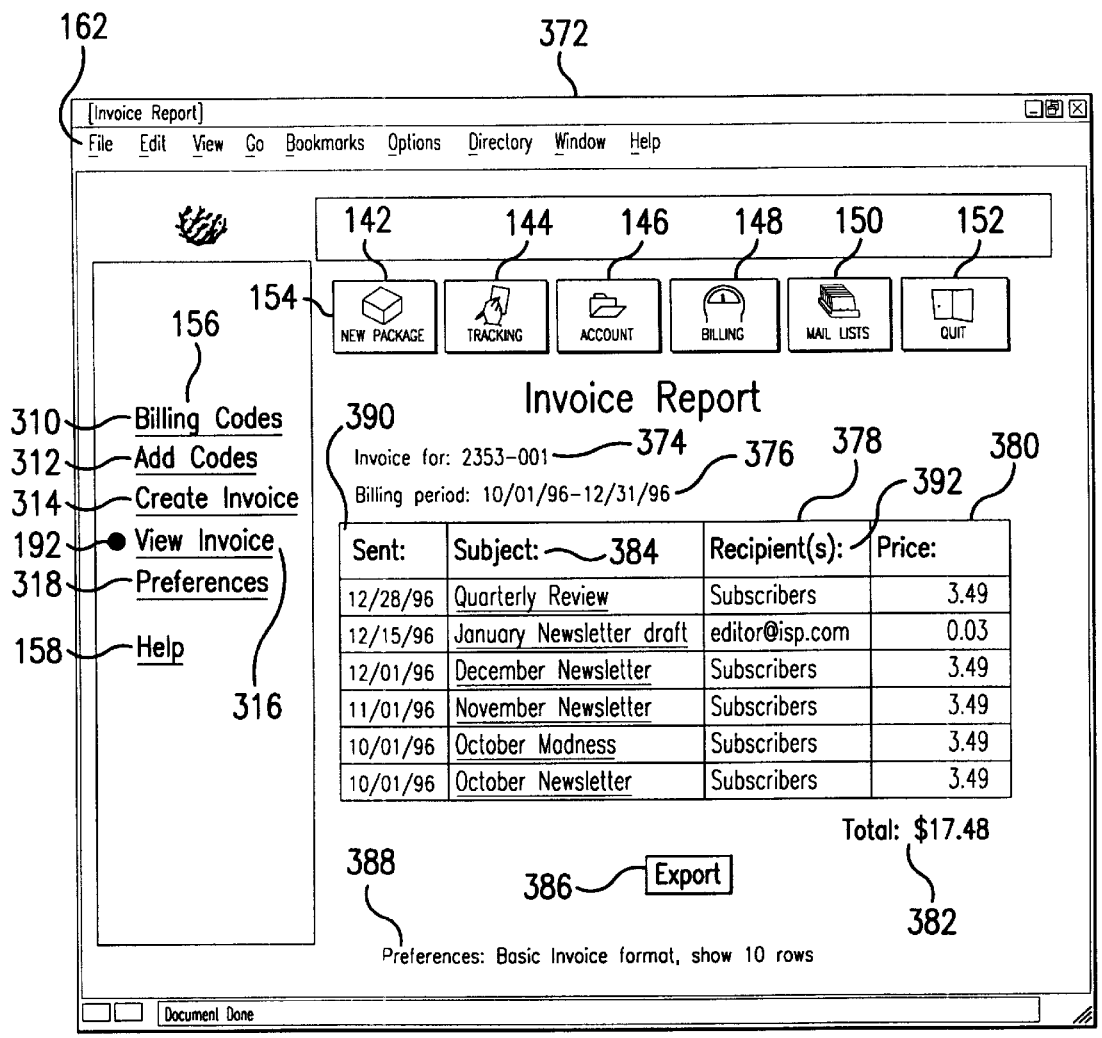
FIG. 19 is a view of a basic invoice report window according to the invention.

The query result is presented in a pre-formatted basic invoice report window 372 in view Invoice mode, as shown in FIG. 19. The billing code 374 and billing period 376 are displayed, along with the table 378 containing the query results.

The table displays the subject 384 of each delivery, the date sent 390, and the recipient(s) 392. The price 380 and the total 382 of the deliveries are also indicated.

Invoice format is specified in the billing preferences. The subject 384 of each delivery is hot-linked to the package detail report, described above. If the package detail is accessed, the navigation state remains in billing/view invoice. Clicking on view invoice 316 returns the display to the invoice report.

The export button 386 allows users to export the report data as a tab-delimited text file for integration into other existing billing systems. Invoice report preferences 388 (excluding the mark-up rate) are also displayed.

Figure 20:
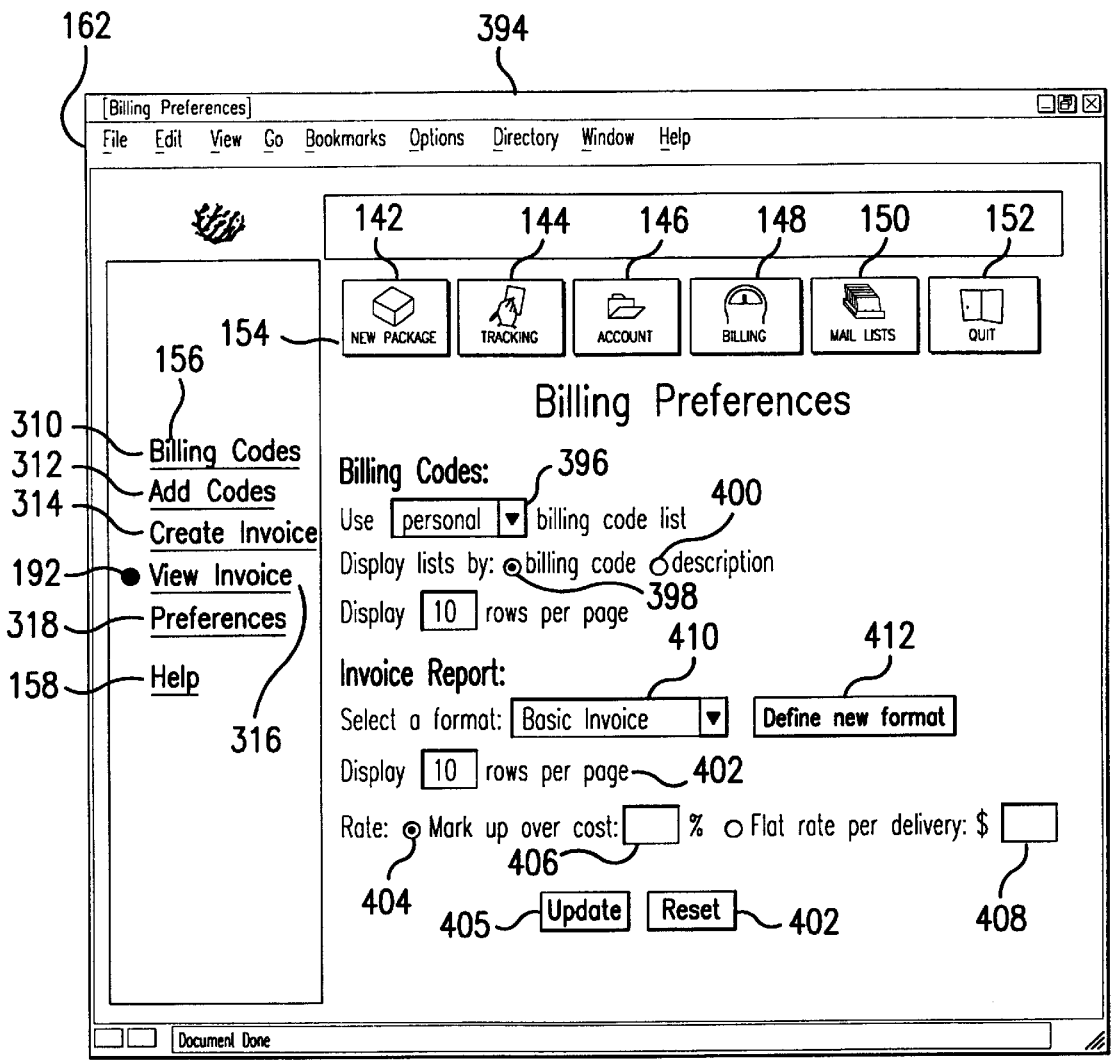
FIG. 20 is a view of a billing preferences dialog according to the invention.

Billing preferences 318 allow users to specify the preferences which affect billing code management and invoice report formats. FIG. 20 is a view of a billing preferences dialog 394 according to the preferred embodiment of the invention.

A pull-down 396 allows group members to choose to use a personal billing code list or a group billing code list maintained by the account manager. All users choose to display lists by billing code 398, or by description 400. This selection affects the display in selection boxes in send options and invoicing.

The selection also affects the presentation of the billing codes display table. If display is by billing code, then the first column is billing code, and the list is sorted by billing code. If display is by description, the first column is description and the list is sorted by description. The user specifies the number of rows displayed 402 per page.

The user also specifies the rate 404 to charge clients. This rate can be a flat charge 408, or may include a percentage mark-up 406 on top of the costs charged by the user's Internet services provider. The information displayed in the billing preferences dialog can be updated 405 or refreshed 407.

For the invoice report, the user may select a predefined format 410, or define 412 a new format. In the preferred embodiment, the user selects from three predefined formats, the basic invoice, spec invoice, and billing code invoice formats. The basic invoice format has previously been shown in FIG. 19.

Figure 21:
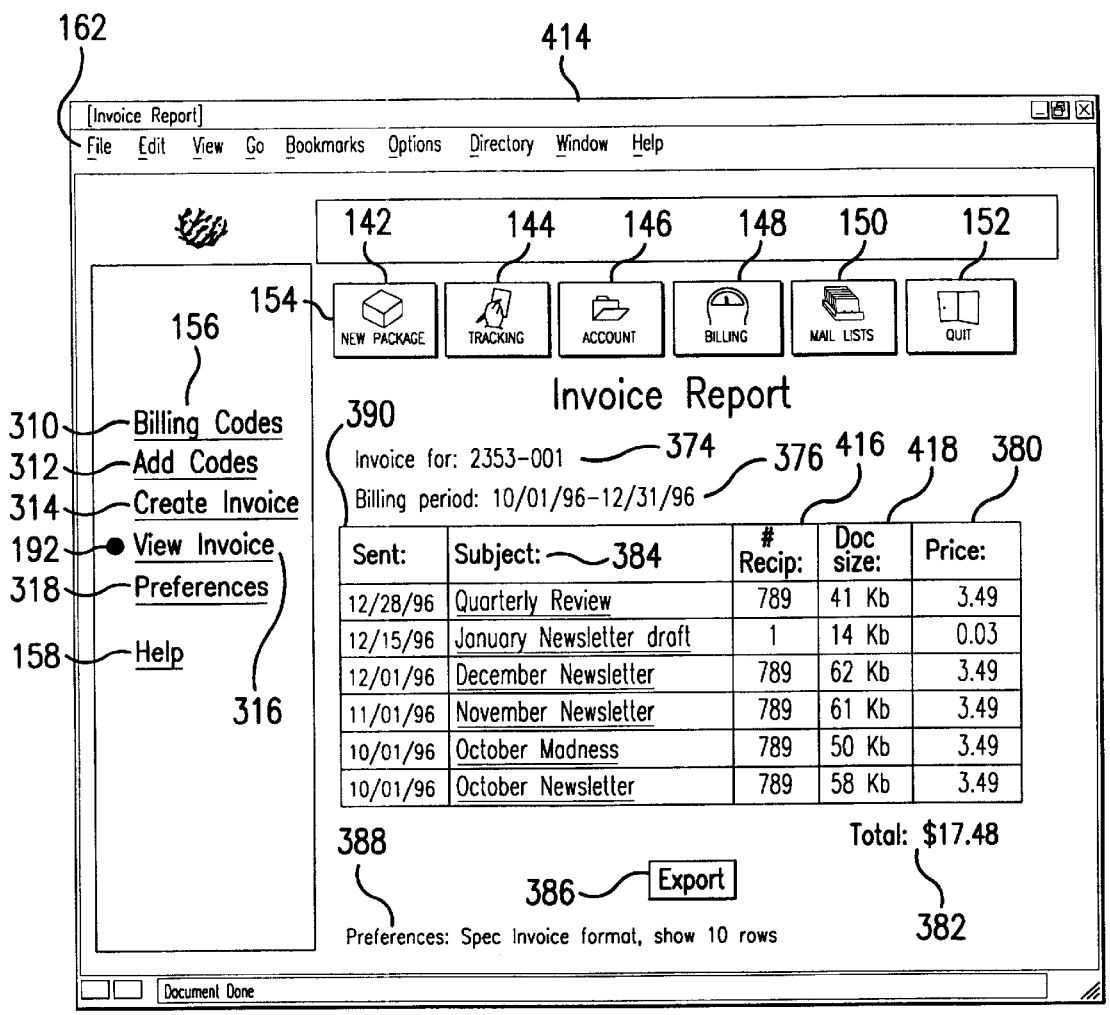
FIG. 21 is a view of an invoice report in spec invoice format according to the invention.

FIG. 21 is a view of an Invoice report in spec invoice format according to the preferred embodiment of the invention. The spec invoice 414 displays the total number 416 of recipients for each delivery as well as the size 418 of the document. This information is sorted chronologically.

Figure 22:
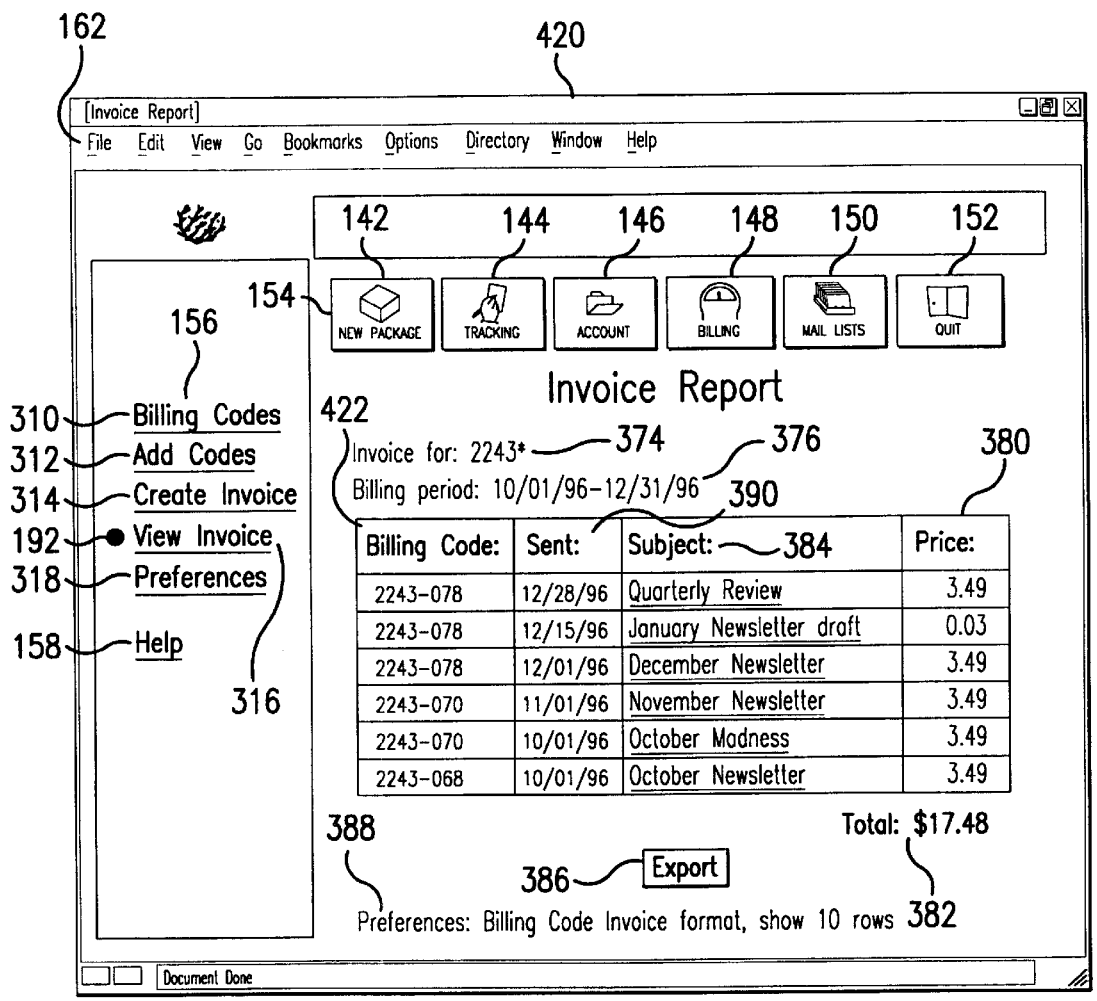
FIG. 22 is a view of an invoice report in billing code invoice format according to the invention.

FIG. 22 is a view of an invoice report in billing code invoice format according to the preferred embodiment of the invention. The billing code invoice format 420 is sorted by billing code 422, as well as by date.

Figure 23:
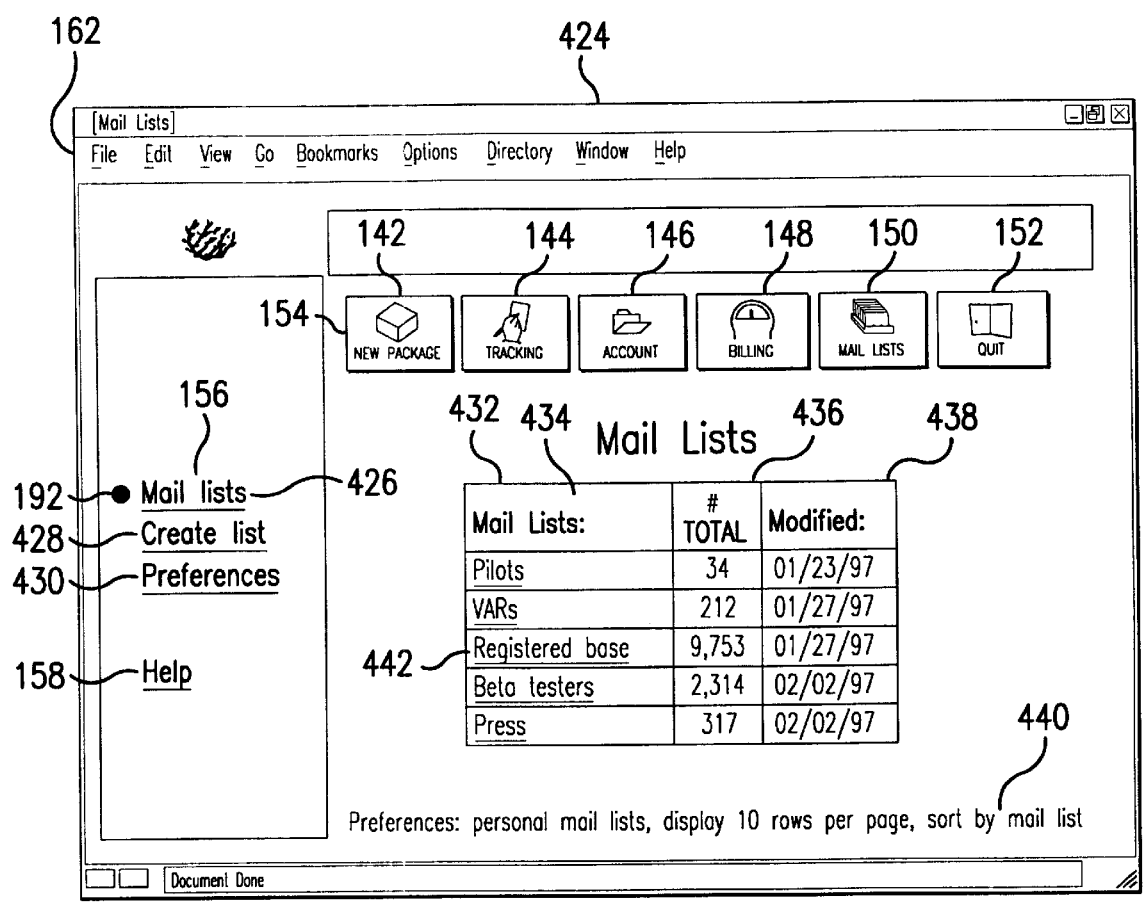
FIG. 23 is a view of a mail list page according to the invention.

The CUI allows publishers and other users to create and manage distribution lists. FIG. 23 is a view of a mail list page 424 according to the preferred embodiment of the invention. Mail list functions are accessible from the main tool bar 154. Secondary navigation includes mail list 426, create list 428, preferences 530 and help 158.

There are two levels of mail lists for group accounts, i.e. group and personal. Group lists are managed by the account manager and are accessible to all group members. A group member can define a personal list accessible only by that group member. Each member can specify which set of lists to use in their mail list preferences.

Clicking on the mail list button 150 on the main tool bar 154 displays a table 432 listing existing mail lists 434. The table also presents the total number 436 of recipients on each mail list and the date 438 the mail list was most recently modified. The preferences settings 440 are also displayed.

In mail list preferences (not shown), the user specifies whether to sort the items by the name of the mail list or by.date. Current preferences are displayed in the mail lists dialog. Next and previous buttons (not shown) may be provided to navigate between pages of mail lists.

Figure 24:
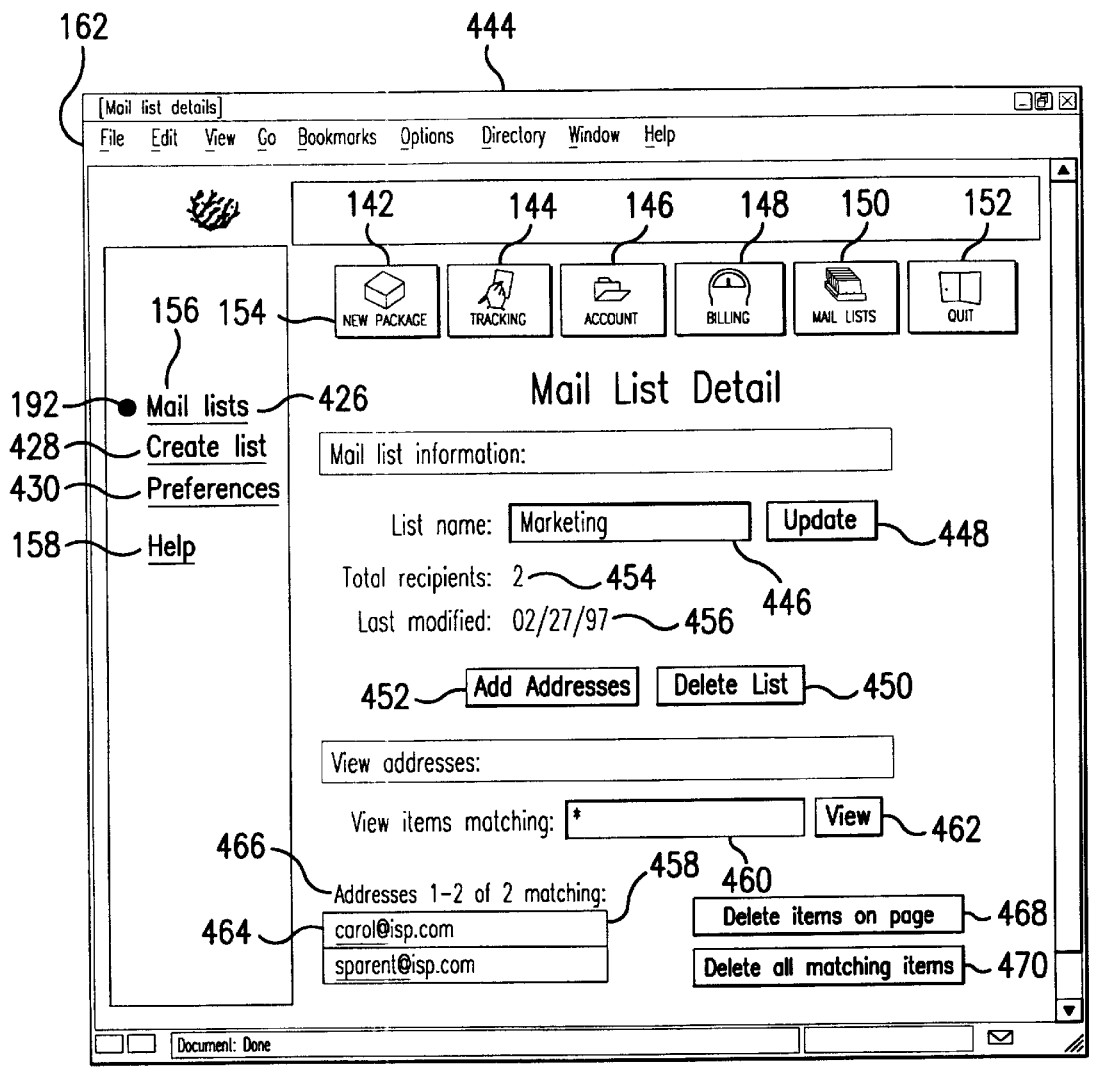
FIG. 24 is a view of a mail list detail page according to the invention.

Clicking on the hot-linked name 442 of a mail list brings up a mail list detail for the selected mail list. FIG. 24 is a view of a mail list detail Page 444, according to the preferred embodiment of the invention.

The mail list detail page displays general information about an existing mail list and allows the user to view and manage mail list addresses. Group members cannot manipulate group mail lists. Therefore, the mail list detail of group lists does not display fields for editing. Group members can, however, edit personal mail lists.

Account Managers can manipulate group mail lists. The detail 444 presented to account managers displays the name 446 of the mail list in an editable form. To rename the list, the user changes the name in the form and clicks on the update button 448. Users may also delete 450 the entire mail list or add addresses 452 by clicking on the appropriate button. The total recipients 454 and date last modified 456 are also displayed.

The detail also displays the mail list addresses 458. In the preferred embodiment of the invention, the first page of the complete address list is displayed in accordance with the number of rows per page specified in the mail list preferences. The detail indicates which addresses out of the total are displayed. Next and previous links (not shown) may be provided to navigate between multiple pages of addresses.

The user can also view a select set of addresses by specifying a query in the field 460 provided. For example, an e-mail address or a portion of an address such as a domain name can be specified. Clicking on the view button 462 then displays a table 464 of matching addresses 458. The table indicates which addresses 466 out of the total matchingset of addresses are displayed.

The user edits or deletes individual addresses in the table by clicking on the appropriate address. An edit page (not shown) with update and delete buttons is then displayed. When the address is updated or deleted, users are returned to an updated mail list detail page.

From the detail page, users can also delete multiple addresses at a time. Clicking on the "delete items on page" button 468 deletes all the addresses in the table. Clicking on "delete all matching items" 470 deletes all items which matched the query, whether or not the addresses are visible on the current page. A warning message asking the user to confirm the action is displayed before the dedicated server actually deletes the addresses. Once the addresses are deleted, the detail page is immediately updated and presented to the user.

Figure 25:
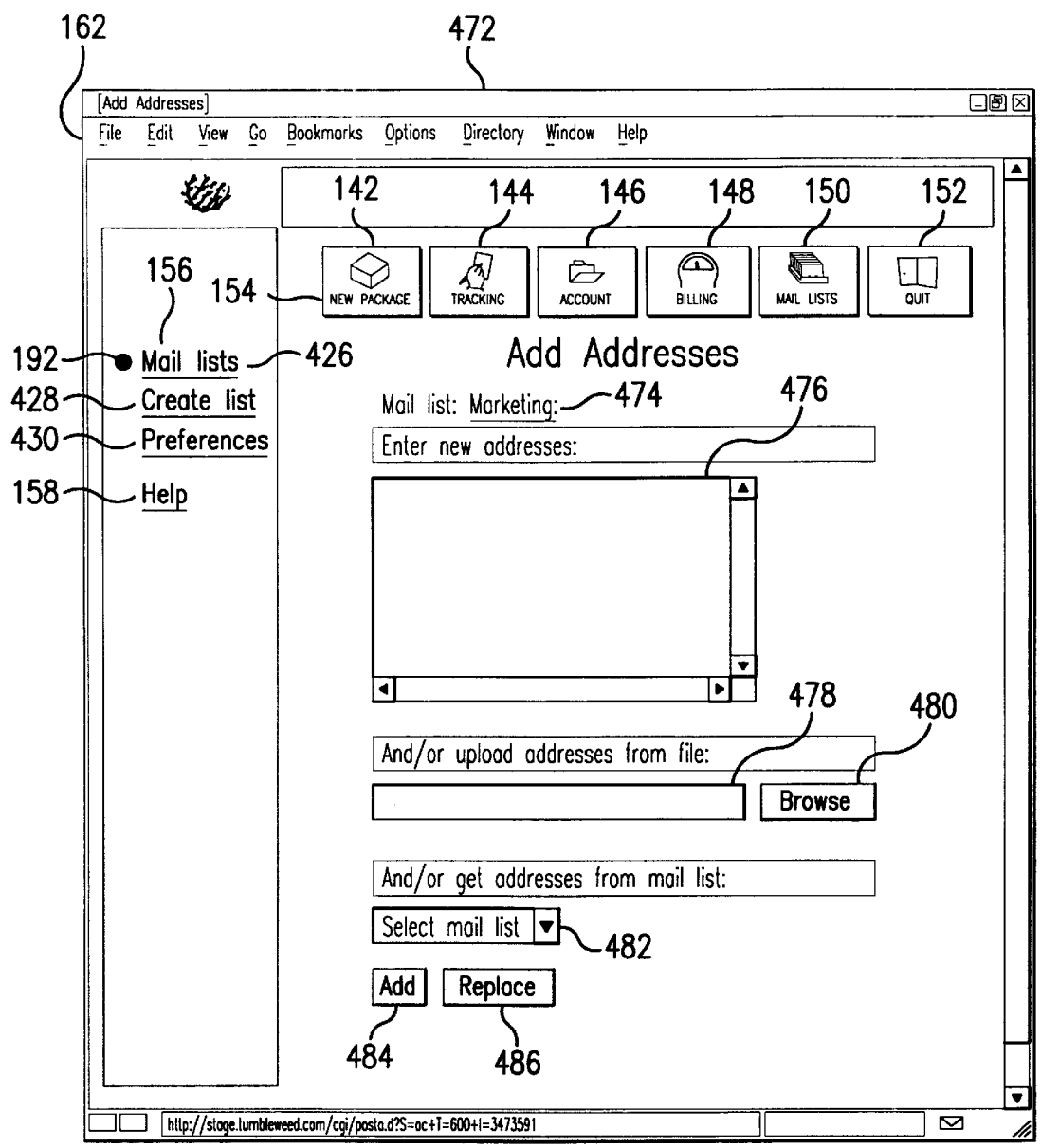
FIG. 25 is a view of an add addresses page according to the invention.

Clicking on the add addresses button 452 in the mail list detail 444 displays the add addresses page. FIG. 25 is a view of an Add Addresses Page 472 according to the preferred embodiment of the invention. The name of the current mail list 474 is displayed at the top. The name is also linked to the mail list detail page.

The user can add additional addresses by manually entry 476, by uploading them from a file. The user can enter a file name 478, or use the browse button 480 to search all files. Names may also be obtained from an existing mail list 482 and merged with the current mail list. The additional addresses are added 484 to the current address list or replace 486 the current list. After the names are submitted, the users are returned to an updated member detail page with a line at the top confirming the addition or replacement that just occurred.

The user can create a new mail list by clicking on the create list link 428 from the secondary navigation. In the preferred embodiment of the invention, the create mail list page (not shown) is similar to the add addresses page. However, in the create mail list page, the user is prompted for the name of the mail list.

The user can manually enter addresses in the provided text box. Alternatively, the user can upload addresses from a file or copy addresses from an existing mail list. However, because the user is creating a new list, there is no option provided to replace an existing list. Clicking add creates a mail list with the specified names and addresses. The user is presented with an updated mail list report, with the new list information included.

The invention also provides security for restricting access to the system to an authorized user. The types of security supported by the invention include authentication layers, secure socket layers, password protection, private key encryption, public key encryption, and certificate authentication. This security is provided by a security framework that includes at least one security module, in at least one of the send client application, the receive client application, and the CUI.

Figure 26:
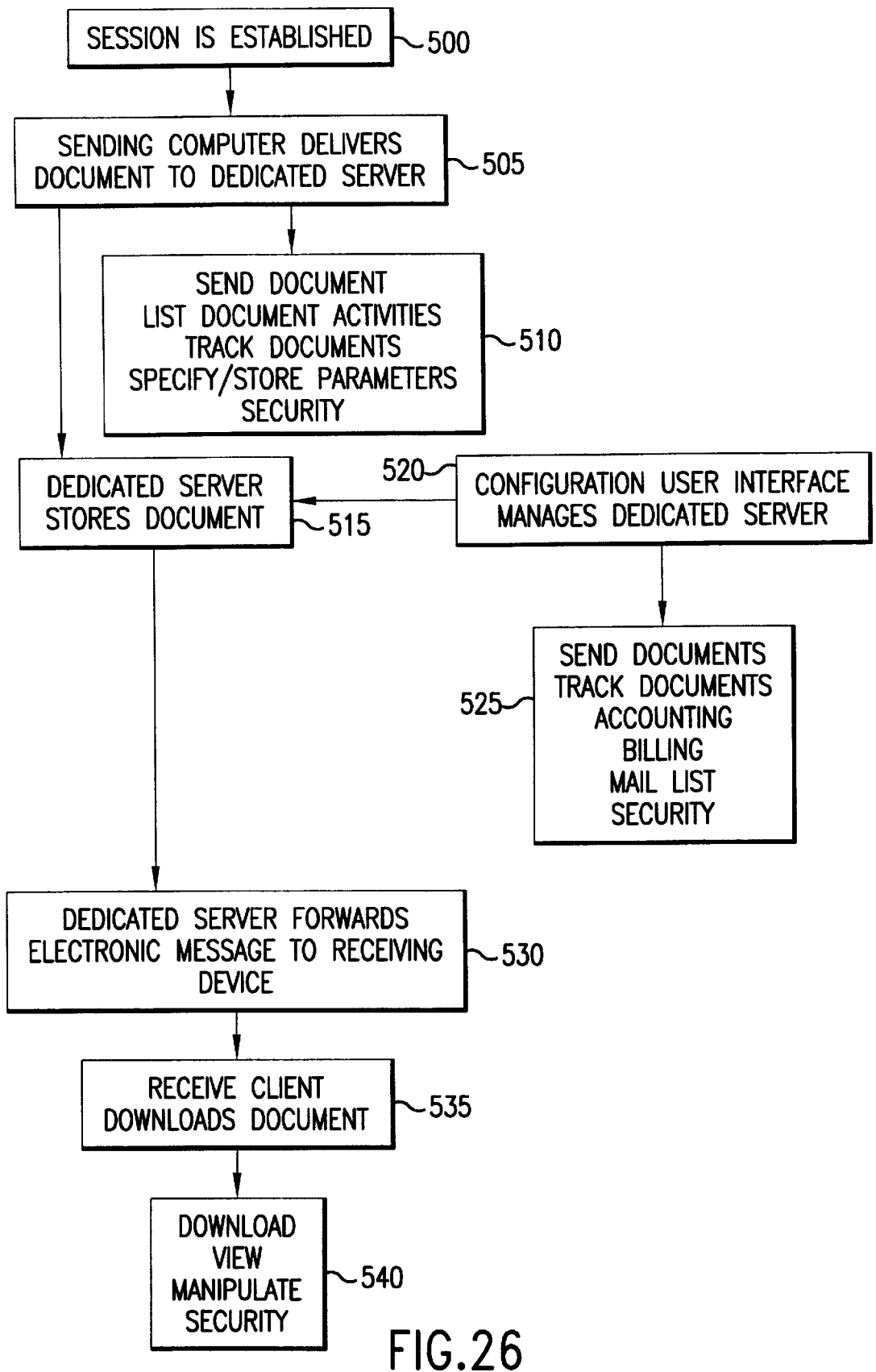
FIG. 26 is a flow chart of the method for delivering a document over an electronic network according to the invention.

FIG. 26 is a flow chart of the method for delivering a document over an electronic network, according to the invention. The sending computer establishes a session (500), for example, over the Internet. The sending computer then delivers the document to a dedicated server (505) over this electronic network, using a send client application.

The send client application preferably includes modules for sending documents, listing document activities, tracking documents, specifying and storing document parameters, and for providing security features (510). Any or all of these modules may be accessed during a particular session.

The dedicated server stores the document (515) and forwards an electronic notification message to the receiving device (530). The dedicated server is managed via a configuration user interface (520). The configuration user interface preferably includes modules for sending documents, tracking documents, accounting, billing, generating mail lists, as well as a security feature module (525).

In response to the notification message, the receiving device downloads the document (535) from the dedicated server using a receive client application. The receive client application preferably includes modules for downloading, viewing, and manipulating the document, as well as for providing security (540).

Although the invention is described herein with reference to the preferred embodiment, one skilled in the art will readily appreciate that other applications may be substituted for those set forth herein without departing from the spirit and scope of the present invention. The invention is readily constructed and configured by one skilled in the art, using well-known programming techniques and equipment.

For example, the placement and contents of the toolbars and menus in the desktop displays described herein is for exemplary purposes only. Furthermore, the functions of the invention may be accessed by alternate means, including icons, and keyboard text entries.

In one embodiment of the invention, the notification message regarding a document delivery is received by a notification receiving device. The document can then be retrieved by a receiving device that is either included in the notification receiving device, or is separate therefrom. For example, the notification message can be received on a pager or personal digital assistant, and the document received on a personal computer using a Web browser.

Accordingly, the invention should only be limited by the claims included below.

What is claimed is:

1. A data file management and delivery apparatus comprising:
   a send client application for sending at least one pre-existing data file as a single package from a sending computer according to a network protocol during a session;
   a server for receiving said at least one pre-existing data file from the sending computer through said network and for sending a message to a receiving device; and
   a receive client application on said receiving device for accessing said at least one pre-existing data file from the server according to said network protocol in response to the message to thereby effect delivery of the package to the recipient.

2. The apparatus of claim 1, wherein said receiving device is one of a personal computer, network server device, fax machine, printer, Internet-compatible telephone, Internet access appliance, or personal digital assistant.

3. The apparatus of claim 1, wherein said receive client application is a Web browser.

4. The apparatus of claim 1, wherein said send client application comprises an application window.

5. The apparatus of claim 4, wherein said application window is a Web browser.

6. The apparatus of claim 1, wherein a format of said pre-existing data file can be specified in said send client application.

7. The apparatus of claim 4, wherein said application window comprises:
   a tool bar for accessing main functions of the send client application;
   a package manager for listing all data file activities initiated during said session; and
   a menu listing operational commands for said send client application.

8. The apparatus of claim 1, wherein said send client application further comprises a package window for specifying parameters which in turn specify a manner in which said package of said at least one pre-existing data file is delivered.

9. The apparatus of claim 1, wherein said send client application is accessed via a first icon.

10. The apparatus of claim 8, wherein said send client application further comprises a storage module for configurably storing said parameters, wherein said data file delivery is initiated using said parameters.

11. The apparatus of claim 10, wherein said parameters are accessed via a first icon.

12. The apparatus of claim 1, wherein said send client application further comprises
   a module for accessing an address book from a supported application on said sending computer,
   wherein said data file delivery is initiated using the contents of said address book.

13. The apparatus of claim 1, wherein said pre-existing data file is delivered by selecting and dragging said data file onto one of an application window, a package window, an icon representing said send client application, or an icon for accessing said stored data file delivery parameters.

14. The apparatus of claim 1, further comprising a Configuration User Interface for managing said server.

15. The apparatus of claim 14, wherein said configuration user interface comprises an HTML interface for invoking and customizing said server via a Web browser.

16. The apparatus of claim 14, wherein said Configuration User Interface comprises:
   a sending module for sending said at least one pre-existing data file;
   a tracking module for tracking said at least one pre-existing data file;
   an account CUI for accessing information associated with a data file delivery account;
   a billing module for managing billings for said data file delivery; and
   a mail list module for creating and managing mail distribution lists.

17. The apparatus of claim 14, wherein said configuration user Interface comprises a configuration user interface application window displayed on a computer desktop.

18. The apparatus of claim 17, wherein said Configuration User Interface application window comprises:
   a main tool bar for accessing main functions of said configuration user interface;
   a secondary tool bar for accessing functions within said main functions;
   a workspace for displaying an interactive interface to an accessed function; and
   a menu listing operational commands for said configuration user interface.

19. The apparatus of claim 1, further comprising a security framework for restricting access to said apparatus, said security framework having at least one security module in at least one of said send client application, said receive client application, and a configuration user interface.

20. The apparatus of claim 19, wherein said security framework supports at least one of authentication layers, secure socket layers, password protection, private key encryption, public key encryption, and certificate authentication.

21. The apparatus of claim 1, wherein said network is one of the Internet or an intranet system.

22. The apparatus of claim 1 wherein said at least one pre-existing data file is sent to a plurality of recipients.

23. The apparatus of claim 1 wherein said message is an electronic mail message.

24. A method for data file management and delivery through a network, comprising the steps of:
sending at least one pre-existing data file as a single package from a sending computer to a server according to a network protocol during a session using a send client application;
storing said at least one pre-existing data file from said sending computer on said server;
sending a message to a receiving device from said server; and
downloading said at least one pre-existing data file from said server according to said network protocol using a receive client application on said receiving device, in response to the message to thereby effect delivery of the package to the receiving device.

25. The method of claim 24, wherein said receive client application is operable on one of a personal computer, network server device, fax machine, printer, Internet-compatible telephone, Internet access appliance, or personal digital assistant.

26. The method of claim 24, wherein said receive client application is a Web browser.

27. The method of claim 24, further comprising the step of:
said sending computer desktop displaying an application window with a send client application interface having a tool bar for accessing main functions of said send client application, a package manager for listing all data file activities initiated during said session, and a menu listing operational commands for said send client application.

28. The method of claim 24, further comprising specifying parameters of said data file delivery with a package window in said send client application.

29. The method of claim 24, further comprising the step of:
displaying a first icon for accessing said send client application.

30. The method of claim 28, comprising the step of:
configurably storing, in a storage module, said parameters, wherein said downloading is performed in accordance with said parameters.

31. The method of claim 30, comprising the step of:
displaying a second icon for accessing said parameters.

32. The method of claim 24, further comprising the step of:
providing a security framework for restricting access to said system.

33. The method of claim 24, wherein forwarding an electronic message comprises:
forwarding an electronic message in accordance with contents of an address book of a supported application on said sending computer.

34. The method of claim 24, further comprising the step of:
managing said server via a Web browser.

35. The method of claim 34, further comprising the step of:
displaying a Configuration User Interface application window for managing said server on a computer desktop, said configuration user interface application window having a main tool bar for accessing main functions of said configuration user interface, a secondary tool bar for accessing functions within said main functions, a workspace for displaying an interactive interface to an accessed function, and a menu listing operational commands for said configuration user interface.

36. The method of claim 24, wherein said network is one of the Internet or an intranet system.

37. The method of claim 24 further comprising the step of:
sending said at least one data file to a plurality of recipients.

38. The apparatus of claim 1, further comprising a security framework for restricting access to said data file, said security framework having at least one security module in at least one of said send client application, said receive client application, and a configuration user interface.

39. The apparatus of claim 38, wherein said security framework supports at least one of authentication layers, secure socket layers, password protection, private key encryption, public key encryption, and certificate authentication.

40. The method of claim 32 wherein said security framework supports at least one of authentication layers, secure socket layers, password protection, private key encryption, public key encryption, and certificate authentication.

41. A method for delivering a package which includes one or more data files, the method comprising:
receiving, from a sender, package data which specify the package and the one or more data files and recipient data specifying one or more intended recipients of the package according to a network protocol; and
sending to each of the one or more intended recipients a message which includes package identification data wherein the package identification data specifies the package of one or more data files and enables retrieval of the package according to the network protocol.

42. The method of claim 41 further comprising:
receiving, from a specific one of the one or more intended recipients, the package identification data; and
in response to receiving the package identification data, sending the one or more data files of the package to the specific intended recipient.

43. The method of claim 41 wherein receiving the package comprises:
sending a form to the sender in which the one or more data files and the one or more intended recipients can be specified by user-generated form data; and
receiving the form data wherein the form data specifies the one or more data files and the one or more intended recipients.

44. The method of claim 43 wherein the form data is hypertext markup language form data.

45. The method of claim 43 wherein the form is a hypertext markup language form.

46. The method of claim 43 wherein the form enables specification of delivery parameter data which specify a manner in which the one or more intended recipients can access the one or more data files.

47. The method of claim 46 wherein the delivery parameter data specify a format in which a selected one of the one or more data files is stored once received from the sender.

48. The method of claim 41 wherein sending the message comprises sending the message using a simple mail transport protocol (SMTP).

49. the method of claim 41 wherein the one or more data files are at least two in number.

50. The method of claim 41 further comprising:
  receiving, from the sender, a request for status data regarding delivery of the package; and
  in response to the request, sending the status data to the sender.

51. The method of claim 50 wherein the status data identifies at least one of the intended recipients.

52. The method of claim 50 wherein the status data specifies a time at which the message was sent to the one or more intended recipients.

53. The method of claim 52 wherein the time comprises a date.

54. The method of claim 50 wherein the status data specifies a time at which the package was accessed by the one or more intended recipients.

55. The method of claim 54 wherein the time comprises a date.

56. The method of claim 50 wherein the status data specifies whether the package has been accessed by the one or more intended recipients.

57. The method of claim 50 wherein the message has been sent to the one or more intended recipients.

58. A computer readable medium useful in association with a computer which includes a processor and a memory, the computer readable medium including computer instructions which are configured to cause the computer to deliver a package which includes one or more data files by:
  receiving from a sender data specifying the package and the one or more data file and data specifying one or more intended recipients of the package according to a network protocol; and
  sending to each of the one or more intended recipients a message which includes package identification data wherein the package identification data specifies the package of one or more data files and enables retrieval of the package according to the network protocol.

59. The computer readable medium of claim 58 wherein the computer instructions are configured to cause the computer to deliver the package by also:
  receiving, from a specific one of the one or more intended recipients through the network, the package identification data; and
  in response to receiving the package identification data, sending the one or more data files of the package to the specific intended recipient through the network.

60. The computer readable medium of claim 58 wherein receiving the package comprises:
  sending a form to the sender in which the one or more data files and the one or more intended recipients can be specified by user-generated form data; and
  receiving the form data wherein the form data specifies the one or more data files and the one or more intended recipients.

61. The computer readable medium of claim 60 wherein the form data is hypertext markup language form data.

62. The computer readable medium of claim 60 wherein the form is a hypertext markup language form.

63. The computed readable medium of claim 60 wherein the form enables specification of delivery parameter data which specify a manner in which the one or more intended recipients can access the one or more data files.

64. The computer readable medium of claim 63 wherein the delivery parameter data specify a format in which a selected one of the one or more data files are stored once received from the sender.

65. The computer readable medium of claim 58 wherein sending the message comprises sending the message using a simple mail transport protocol (SMTP).

66. The computer readable medium of claim 58 wherein the one or more data files are at least two in number.

67. The computer readable medium of claim 58 wherein the computer instructions are configured to cause the computer to deliver the package by also:
  receiving, from the sender, a request for status data regarding delivery of the package; and
  in response to the request, sending the status data to the sender.

68. The computer readable medium of claim 67 wherein the status data identifies at least one of the intended recipients.

69. The computer readable medium of claim 67 wherein the status data specifies a time at which the message was sent to the one or more intended recipients.

70. The computer readable medium of claim 69 wherein the time comprises a date.

71. The computer readable medium of claim 67 wherein the status data specifies a time at which the package was accessed by the one or more intended recipients.

72. The computer readable medium of claim 71 wherein the time comprises a date.

73. The computer readable medium of claim 67 wherein the status data specifies whether the package has been accessed by the one or more intended recipients.

74. The computer readable medium of claim 67 wherein the message has been sent to the one or more intended recipients.

75. A computer system comprising:
  a processor;
  a memory operatively coupled to the processor; and
  a package delivery module (i) which executes in the processor from the memory and (ii) which, when executed by the processor, causes the computer to deliver a package which includes one or more data files by:
    receiving from a sender data specifying the package and the one or more data file and data specifying one or more intended recipients of the package according to a network protocol; and
    sending to each of the one or more intended recipients a message which includes package identification data wherein the package identification data specifies the package of one or more data files and enables retrieval of the package according to the network protocol.

76. The computer system of claim 75 wherein the package delivery module is configured to cause the computer to deliver the package by also:
  receiving, from a specific one of the one or more intended recipients through the network, the package identification data; and
  in response to receiving the package identification data, sending the one or more data files of the package to the specific intended recipient through the network.

77. The computer system of claim 75 wherein receiving the package comprises:
  sending a form to the sender in which the one or more data files and the one or more intended recipients can be specified by user-generated form data; and
  receiving the form data wherein the form data specifies the one or more data files and the one or more intended recipients.

78. The computer system of claim 77 wherein the form data is hypertext markup language form data.

79. The computer system of claim 77 wherein the form is a hypertext markup language form.

80. The computer system of claim 77 wherein the form enables specification of delivery parameter data which specify a manner in which the one or more intended recipients can access the one or more data files.

81. The computer system of claim 80 wherein the delivery parameter data specify a format in which a selected one of the one or more data files is stored once received from the sender.

82. The computer system of claim 75 wherein sending the message comprises sending the message using a simple mail transport protocol (SMTP).

83. The computer system of claim 75 wherein the one or more data files are at least two in number.

84. The computer system of claim 75 wherein the package delivery module is configured to cause the computer to deliver the package by also:

receiving, from the sender, a request for status data regarding delivery of the package; and in response to the request, sending the status data to the sender.

85. The computer system of claim 84 wherein the status data identifies at least one of the intended recipients.

86. The computer system of claim 84 wherein the status data specifies a time at which the message was sent to the one or more intended recipients.

87. The computer system of claim 86 wherein the time comprises a date.

88. The computer system of claim 84 wherein the status data specifies a time at which the package was accessed by the one or more intended recipients.

89. The computer system of claim 88 wherein the time comprises a date.

90. The computer system of claim 84 wherein the status data specifies whether the package has been accessed by the one or more intended recipients.

91. The computer system of claim 84 wherein the message has been sent to the one or more intended recipients.

92. A method for delivering a package which includes one or more data files, the method comprising:

receiving user-generated data specifying the one or more data files;

receiving user-generated data specifying one or more intended recipients of the package;

receiving user-generated data specifying a destination format for at least a selected one of the one or more data files;

converting the at least one selected data file from a native format to the destination format; and providing, to the one or more intended recipients, access to the one or more data files which include the at least one selected data file in the destination format.

93. A computer readable medium useful in association with a computer which includes a processor and a memory, the computer readable medium including computer instructions which are configured to cause the computer to deliver a package which includes one or more data files by:

receiving user-generated data specifying the one or more data files;

receiving user-generated data specifying one or more intended recipients of the package;

receiving user-generated data specifying a destination format for at least a selected one of the one or more data files;

converting the at least one selected data file from a native format to the destination format; and providing, to the one or more intended recipients, access to the one or more data files which include the at least one selected data file in the destination format.

94. A computer system comprising:

a processor;

a memory operatively coupled to the processor; and a package delivery module (i) which executes in the processor from the memory and (ii) which, when executed by the processor, causes the computer to delivering a package which includes one or more data files by:

receiving user-generated data specifying the one or more data files;

receiving user-generated data specifying one or more intended recipients of the package;

receiving user-generated data specifying a destination format for at least a selected one of the one or more data files;

converting the at least one selected data file from a native format to the destination format; and providing, to the one or more intended recipients, access to the one or more data files which include the at least one selected data file in the destination format.

95. The apparatus of claim 8 wherein the parameters include a priority with which the package is to be delivered.

96. The apparatus of claim 8 wherein the parameters include data specifying an expiration of the package.

97. The apparatus of claim 8 wherein the parameters include data requesting a return message confirming receipt by the recipient.

98. The apparatus of claim 8 wherein the parameters include data specifying a schedule for notification of the recipient.

99. The apparatus of claim 8 wherein the parameters specify a degree of security to be used in delivering the package.

100. The apparatus of claim 8 wherein the parameters specify a billing code associated with the package.

101. The method of claim 41 wherein the one or more intended recipients include at least two intended recipients.

102. The computer readable medium of claim 58 wherein the one or more intended recipients include at least two intended recipients.

103. The computer system of claim 75 wherein the one or more intended recipients include at least two intended recipients.

* * * * *